United States Patent
Sun et al.

(10) Patent No.: US 10,594,464 B2
(45) Date of Patent: Mar. 17, 2020

(54) ELECTRONIC DEVICE AND USER EQUIPMENT IN WIRELESS COMMUNICATION SYSTEM AND WIRELESS COMMUNICATION METHOD

(71) Applicants: Chen Sun, Beijing (CN); Bingshan Hu, Beijing (CN); SONY CORPORATION, Tokyo (JP)

(72) Inventors: Chen Sun, Beijing (CN); Bingshan Hu, Beijing (CN)

(73) Assignee: Sony Corporation, Tokyo (JP)

(*) Notice: Subject to any disclaimer, the term of this patent is extended or adjusted under 35 U.S.C. 154(b) by 16 days.

(21) Appl. No.: 15/771,504

(22) PCT Filed: Oct. 27, 2016

(86) PCT No.: PCT/CN2016/103534
§ 371 (c)(1),
(2) Date: Apr. 27, 2018

(87) PCT Pub. No.: WO2017/076215
PCT Pub. Date: May 11, 2017

(65) Prior Publication Data
US 2019/0253224 A1    Aug. 15, 2019

(30) Foreign Application Priority Data
Nov. 5, 2015   (CN) .......................... 2015 1 0747087

(51) Int. Cl.
*H04L 5/00* (2006.01)
*H04W 16/14* (2009.01)
(Continued)

(52) U.S. Cl.
CPC ......... *H04L 5/0055* (2013.01); *H04B 17/318* (2015.01); *H04L 41/06* (2013.01);
(Continued)

(58) Field of Classification Search
CPC ....... H04L 5/0055; H04L 41/06; H04L 43/16; H04B 17/318; H04W 16/14; H04W 74/08
See application file for complete search history.

(56) References Cited

U.S. PATENT DOCUMENTS

2006/0234638 A1* 10/2006 Mueckenheim ....... H04B 17/20
                                                     455/67.11
2012/0140743 A1*  6/2012 Pelletier ............ H04W 72/0453
                                                     370/335
(Continued)

FOREIGN PATENT DOCUMENTS

| CN | 1449206 A | 10/2003 |
| CN | 102340884 A | 2/2012 |
| CN | 102364978 A | 2/2012 |

*Primary Examiner* — Duc C Ho
(74) *Attorney, Agent, or Firm* — Xsensus LLP

(57) ABSTRACT

An electronic device and a user equipment in a wireless communication system and a wireless communication method. The electronic device includes: one or more processing circuits configured to acquire NACK information indicating an information transmission failure between a transmitting end and a receiving end in a wireless communication system and to acquire failure cause information indicating a cause of the information transmission failure, wherein the cause of the information transmission failure is classified as a link quality cause or a non-link quality cause; and when the cause of the information transmission failure is determined to be the non-link quality cause, generating spectrum sensing parameter information to adjust a spectrum sensing parameter at the transmitting end to increase a probability of successful information transmission between the transmitting end and the receiving end.

20 Claims, 9 Drawing Sheets

(51) Int. Cl.
*H04W 74/08* (2009.01)
*H04B 17/318* (2015.01)
*H04L 12/24* (2006.01)
*H04L 12/26* (2006.01)

(52) U.S. Cl.
CPC ............ *H04L 43/16* (2013.01); *H04W 16/14* (2013.01); *H04W 74/08* (2013.01)

(56) References Cited

U.S. PATENT DOCUMENTS

2014/0043979 A1* 2/2014 Etemad .................. H04W 4/70
370/237
2015/0045018 A1* 2/2015 Liu ......................... H04L 1/00
455/426.1

* cited by examiner

ELECTRONIC DEVICE AND USER EQUIPMENT IN WIRELESS COMMUNICATION SYSTEM AND WIRELESS COMMUNICATION METHOD

The present application claims the priority to Chinese Patent Application No. 201510747087.3, titled "ELECTRONIC DEVICE AND USER EQUIPMENT IN WIRELESS COMMUNICATION SYSTEM AND WIRELESS COMMUNICATION METHOD", filed on Nov. 5, 2015 with the Chinese State Intellectual Property Office, which is incorporated herein by reference in its entirety.

FIELD

The present disclosure relates to the technical field of wireless communication, and in particular to an electronic device and a user equipment in a wireless communication system, and a method for performing wireless communication in a wireless communication system.

BACKGROUND

This part provides background information related to the present disclosure, which is not necessarily the conventional technology.

With the development and evolution of wireless networks, more and more services are carried by the wireless networks. In this case, additional spectrum resources are required to support transmission of a large amount of data. Cellular wireless network operators start discussing how to use unlicensed spectrum resources such as the 5 GHz ISM (Industrial Scientific Medical) frequency band, on the basis of utilization of the existing LTE (Long Term Evolution) networks. On the other hand, in the WiFi wireless industry, more WiFi systems are deployed on the unlicensed spectrum. Communication systems between different operators and different systems have equal rights to use the unlicensed frequency band. However, different operators and different systems may be interfered with each other when using unlicensed spectrum resources, which results in failed information transmission on one side.

In a WiFi system, a contention window (CW) is one of the effective solutions for resolving the resource conflict. When a transmitting node configured with a contention window is to perform data transmission, the transmitting node needs to randomly select a random number in the range of the contention window as a waiting time period, and transmits data using corresponding resources when the waiting time period elapses. A spectrum management server in the system may set a contention window size (CWS) for each transmitting node according to different requirements, where a greater contention window size corresponds to a smaller probability of using the unlicensed spectrum by the transmitting node, and a smaller contention window size corresponds to a greater probability of using the unlicensed spectrum by the transmitting node. In a system that does not support the contention window, such as an LTE system, a counter may be configured for each transmitting node, which plays a same role as the contention window. When a transmitting node configured with the counter is to perform data transmission, the transmitting node may use a value of the counter as a waiting time period, and transmit data using corresponding resources when the waiting time period elapses. A node on the network side, for example, the base station, may set the value of the counter for each transmitting node according to different requirements, where a greater value of the counter value corresponds to a smaller probability of using the unlicensed spectrum by the transmitting node, and a smaller value of the counter corresponds to a greater probability of using the unlicensed spectrum by the transmitting node.

In addition, during information transmission using the unlicensed spectrum resources, if a hidden node which is outside the sensing range of the transmitting end and thus is invisible to the transmitting end also performs information transmission, the information transmission of the hidden node interferes with the information transmission by the transmitting end, which results in failed information transmission. In order to solve the problem, an energy detection threshold of the transmitting end may be reduced to extend the sensing range of the transmitting end so that the hidden node is sensed and monitored by the transmitting end.

During the information transmission of a node in a wireless communication system operating on the unlicensed band, failed information transmission may occur due to change in quality of a channel between the transmitting end and the receiving end, or due to inference to the receiving end from a hidden node as described above or from other access mechanisms. In the case of the failed information transmission due to the change in quality of the channel between the transmitting end and the receiving end, it is obviously inappropriate to adjust a spectrum sensing parameter, such as the contention window size or the value of the counter. Therefore, it is important to acquire the cause of the failed information transmission.

Therefore, a new wireless communication technology solution is required, with which the cause of the failed information transmission can be acquired, and the spectrum sensing parameter is adjusted only in a case where the cause of the failed information transmission is a non-link quality cause, thereby increasing a probability of successful information transmission between the transmitting end and the receiving end, and avoiding unnecessary adjustment.

SUMMARY

This part provides an overview of the present disclosure, rather than a full scope or all features of the present disclosure.

An object of the present disclosure is to provide an electronic device and a user equipment in a wireless communication system and a method for performing wireless communication in a wireless communication system, with which a cause of failed information transmission between a transmitting end and a receiving end can be acquired and a spectrum sensing parameter of the transmitting end is adjusted in a case where the cause of the failed information transmission is a non-link quality cause, thereby increasing a probability of successful information transmission between the transmitting end and the receiving end.

According to an aspect of the present disclosure, an electronic device in a wireless communication system is provided. The electronic device includes one or more processing circuits configured to: acquire a NACK message indicating failed information transmission between a transmitting end and a receiving end in the wireless communication system and failure cause information indicating a cause of the failed information transmission, where the cause of the failed information transmission includes a link quality cause and a non-link quality cause; and generate spectrum sensing parameter information if it is determined that the cause of the failed information transmission is the non-link quality cause to adjust a spectrum sensing parameter of the transmitting end, so as to increase a probability of successful information transmission between the transmitting end and the receiving end.

According to another aspect of the present disclosure, an electronic device in a wireless communication system is provided. The electronic device includes one or more processing circuits configured to: acquire a NACK message indicating failed information transmission between a transmitting end and a receiving end in the wireless communication system and failure cause information indicating a cause of the failed information transmission, to inform a spectrum management server in the wireless communication system, where the cause of the failed information transmission includes a link quality cause and a non-link quality cause; and acquire spectrum sensing parameter information from the spectrum management server to adjust a spectrum sensing parameter of the transmitting end, so as to increase a probability of successful information transmission between the transmitting end and the receiving end.

According to another aspect of the present disclosure, a user equipment in a wireless communication system is provided. The user equipment operates as a receiving end and includes a transceiver; and one or more processing circuits configured to: generate a NACK message indicating failed information transmission between a base station serving as a transmitting end and the user equipment in the wireless communication system and failure cause information indicating a cause of the failed information transmission, where the cause of the failed information transmission includes a link quality cause and a non-link quality cause; and control the transceiver to transmit the NACK message and the failure cause information to the base station, to inform a spectrum management server in the wireless communication system.

According to another aspect of the present disclosure, a method for performing wireless communication in a wireless communication system is provided. The wireless communication method includes: acquiring a NACK message indicating failed information transmission between a transmitting end and a receiving end in the wireless communication system and failure cause information indicating a cause of the failed information transmission, where the cause of the failed information transmission includes a link quality cause and a non-link quality cause; and generating spectrum sensing parameter information if it is determined that the cause of the failed information transmission is the non-link quality cause to adjust a spectrum sensing parameter of the transmitting end, so as to increase a probability of successful information transmission between the transmitting end and the receiving end.

According to another aspect of the present disclosure, a method for performing wireless communication in a wireless communication system is provided. The wireless communication method includes: acquiring NACK information indicating failed information transmission between a transmitting end and a receiving end in the wireless communication system and failure cause information indicating a cause of the failed information transmission, to inform a spectrum management server in the wireless communication system, where the cause of the failed information transmission includes a link quality cause and a non-link quality cause; and acquiring spectrum sensing parameter information from the spectrum management server to adjust a spectrum sensing parameter of the transmitting end, so as to increase a probability of successful information transmission between the transmitting end and the receiving end.

According to another aspect of the present disclosure, a method for performing wireless communication in a wireless communication system is provided. The wireless communication method includes: generating a NACK message indicating failed information transmission between a base station serving as a transmitting end and a user equipment serving as a receiving end in the wireless communication system and failure cause information indicating a cause of the failed information transmission, where the cause of the failed information transmission includes a link quality cause and a non-link quality cause; and transmitting the NACK message and the failure cause information to the base station, to inform a spectrum management server in the wireless communication system.

With the electronic device and the user equipment in the wireless communication system and the method for performing wireless communication in the wireless communication system according to the present disclosure, the cause of failed information transmission between the transmitting end and the receiving end can be acquired, and the spectrum sensing parameter of the transmitting end is adjusted in a case where the cause of the failed information transmission is the non-link quality cause, thereby greatly increasing the probability of successful information transmission between the transmitting end and the receiving end, and avoiding adjustment of the spectrum sensing parameter in a case where the cause of the failed information transmission is the link quality cause, thus the system performance is improved.

A further applicability range is apparent from the description provided herein. The description and specific examples in the overview are merely for the purpose of illustration and are not intended to limit the scope of the present disclosure.

BRIEF DESCRIPTION OF THE DRAWINGS

The drawings described herein are provided merely for the purpose of illustrating selected embodiments rather than all possible embodiments, and are not intended to limit the scope of the present disclosure. In the drawings.

Figure 1A:
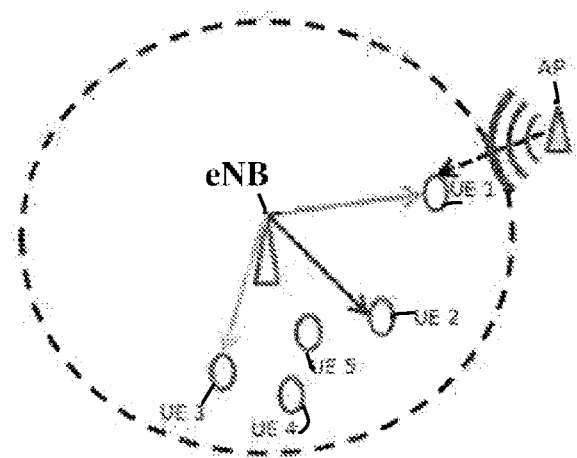
FIG. 1(a) is a schematic diagram showing a downlink transmission being interfered by a hidden node or other access mechanisms in a wireless communication system according to an embodiment of the present disclosure.

While specific embodiments of the present disclosure are shown as examples in the drawings and are described herein in detail, various modifications and variations may be made to the present disclosure. It should be understood that the description for the specific embodiments herein is not intended to limit the present disclosure to the disclosed specific forms, and the present disclosure is intended to encompass all modifications, equivalents and alternatives that fall within the spirit and scope of the present disclosure. It should be noted that reference numerals indicate corresponding parts throughout the drawings.

DETAILED DESCRIPTION OF EMBODIMENTS

Examples of the present disclosure are described more fully with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Various specific details such as examples of specific parts, devices and methods are set forth to provide thorough understanding for the embodiments of the present disclosure. It is apparent to those skilled in the art that the exemplary embodiments may be embodied in many different forms without the specific details, and are not interpreted as a limit for the scope of the present disclosure. In some exemplary embodiments, well-known processes, well-known structures and well-known technologies are not described in detail.

A UE (user equipment) in the present disclosure includes but is not limited to a terminal having a wireless communication function such as a mobile terminal, a computer or an in-vehicle apparatus. Further, depending on a function described, the UE in the present disclosure may also be the UE itself or a component such as a chip in the UE. Similarly, a base station in the present disclosure may be, for example, an eNB (evolution node base station) or a component such as a chip in the eNB.

Figure 1B:
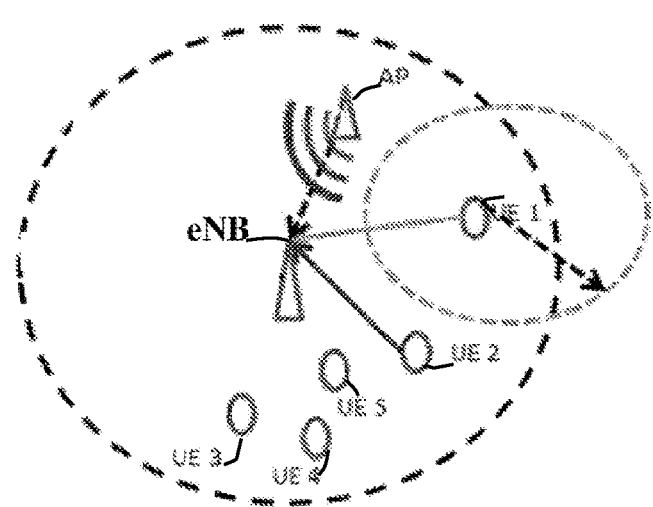
FIG. 1(b) is a schematic diagram showing an uplink transmission being interfered by a hidden node or other access mechanisms in a wireless communication system according to an embodiment of the present disclosure.

FIG. 1(*a*) is a schematic diagram showing a downlink transmission being interfered by a hidden node or other access mechanisms in a wireless communication system according to an embodiment of the present disclosure. As shown in FIG. 1(*a*), UE1 to UE5 exist in the coverage of an eNB, and uplink information transmission and downlink information transmission may be performed between the eNB and each of the UEs. When the eNB transmits downlink data to the UE1, an AP (access point) which is close to the UE1 and outside the energy detection range of the eNB may also transmit data. Since the AP is located outside the energy detection range of the eNB, the eNB cannot detect the existence of the AP and cannot detect whether the AP is transmitting data. In other words, the AP may be regarded as a hidden node. The AP herein may also come from other operators or other access mechanisms. In this case, the UE1 may receive data from both the eNB and the AP when receiving data. Therefore, the UE1 may be interfered by the data from the AP.

FIG. 1(*b*) is a schematic diagram showing an uplink transmission being interfered by a hidden node or other access mechanisms in a wireless communication system according to an embodiment of the present disclosure. As shown in FIG. 1(*b*), UE1 to UE5 exist in the coverage of an eNB, and uplink information transmission and downlink information transmission may be performed between the eNB and each of the UEs. When the UE1 transmits uplink data to the eNB, an AP (access point) which is close to the eNB and outside the energy detection range of the UE1 may also transmit data. Since the AP is outside the energy detection range of the UE1, the UE1 cannot detect the existence of the AP and cannot detect whether the AP is transmitting data. In other words, the AP may be regarded as a hidden node. The AP herein may also come from other operators or other access mechanisms. In this case, the eNB may receive data from both the UE1 and the AP when receiving data.

Therefore, the eNB may be interfered by the data from the AP.

In the scenarios shown in FIG. 1(*a*) and FIG. 1(*b*), failed information transmission between the eNB and the UE1 may be caused by: poor quality of the link between the eNB and the UE1; interference from the hidden node AP; and interference from other operators or access mechanisms. However, in the conventional method, the eNB or the UE1 as a receiving end cannot acquire a cause of the failed information transmission, and may make an inappropriate adjustment. According to the basic principle of the present disclosure, a cause of the failed information transmission or information on the cause of the failed transmission can be acquired by the transmitting end, and an adjustment may be made based on different causes, to increase a probability of successful information transmission between the transmitting end and the receiving end.

Figure 2:
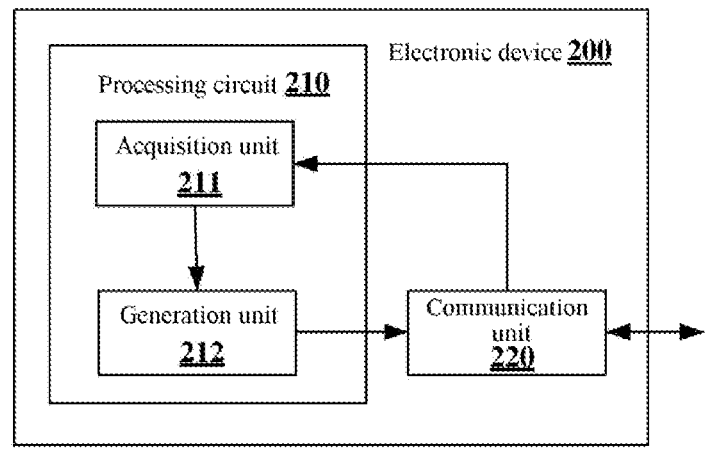
FIG. 2 is a block diagram showing a structure of an electronic device in a wireless communication system according to an embodiment of the present disclosure.

In view of the above technical issue, a technical solution according to the present disclosure is provided. FIG. 2 shows a structure of an electronic device 200 in a wireless communication system according to an embodiment of the present disclosure.

As shown in FIG. 2, the electronic device 200 may include a processing circuit 210. It should be noted that the electronic device 200 may include one processing circuit 210 or multiple processing circuits 210. The electronic device 200 may further include a communication unit 220.

Further, the processing circuit 210 may include various discrete functional units to perform various different functions and/or operations. It should be noted that the functional units may be physical entities or logical entities, and units referred to by different names may be implemented as a same physical entity.

For example, as shown in FIG. 2, the processing circuit 210 may include an acquisition unit 211 and a generation unit 212.

According to the embodiment of the present disclosure, the acquisition unit 211 may acquire a NACK message indicating failed information transmission between a transmitting end and a receiving end in the wireless communication system and failure cause information indicating a cause of the failed information transmission. The cause of the failed information transmission includes a link quality cause and a non-link quality cause.

The acquisition unit 211 may receive the NACK message and the failure cause information from the transmitting end in the wireless communication system, or from the receiving end in the wireless communication system. Further, the acquisition unit 211 may also receive information related to the fail cause from the transmitting end or the receiving end in the wireless communication system. The processing circuit 210 (for example, an analysis unit, which is not shown) analyzes the cause of the failure. The acquisition unit 211 may then transmit the failure cause information indicating the cause of the failed information transmission to the generation unit 212.

According to an embodiment of the present disclosure, if it is determined that the cause of the failed information transmission is the non-link quality cause, the generation unit 212 may generate spectrum sensing parameter information to adjust a spectrum sensing parameter of the transmitting end, so as to increase a probability of successful information transmission between the transmitting end and the receiving end.

The generation unit 212 may acquire the failure cause information from the acquisition unit 211, and may directly or indirectly transmit the generated spectrum sensing parameter information to the transmitting end to adjust the spectrum sensing parameter of the transmitting end.

With the electronic device 200 according to the embodiment of the present disclosure, the cause of failed information transmission between the transmitting end and the receiving end is acquired, and the spectrum sensing parameter of the transmitting end is adjusted only in a case where the cause of the failed information transmission is the non-link quality cause, thereby avoiding adjustment of the spectrum sensing parameter in a case where the cause of the failed information transmission is the link quality cause, and increasing the probability of successful information transmission between the transmitting end and the receiving end.

According to the embodiment of the present disclosure, the spectrum sensing parameter may include an energy detection threshold, a contention window size, a counter, and the like.

According to an embodiment of the present disclosure, if it is determined that the cause of the failed information transmission is the link quality cause, the generation unit 212 of the electronic device 200 may further generate control information to adjust a MCS (Modulation And Coding Set) and an open loop link adaption parameter of the transmitting end.

According to an embodiment of the present disclosure, the electronic device 200 may be a spectrum management server in a core network. The transmitting end may be an eNB or a UE, and the receiving end may be a UE or an eNB. The electronic device 200 may also be located in the eNB.

The electronic device 200 according to the embodiment of the present disclosure is described below in detail in the case of downlink transmission and uplink transmission.

Downlink Transmission

Figure 3:
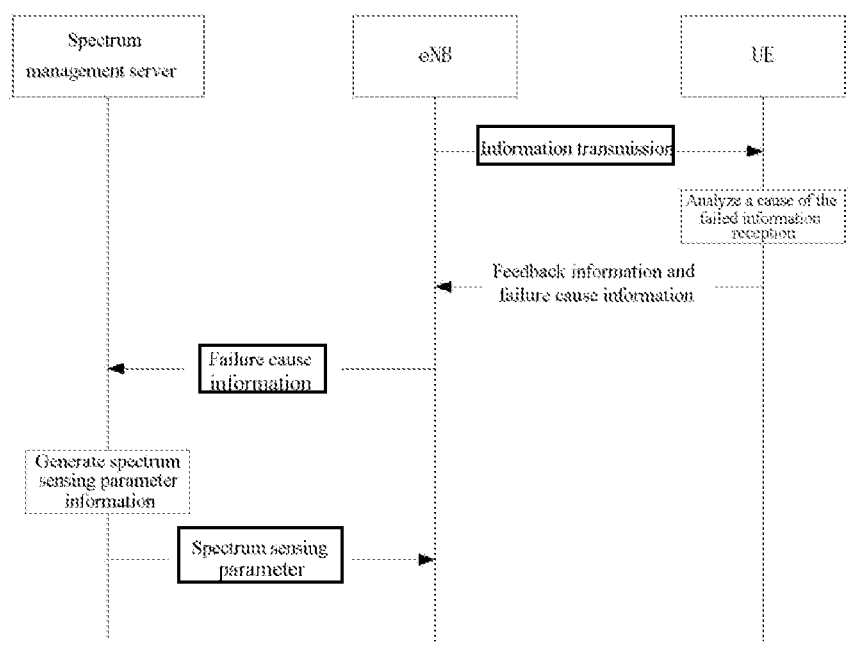
FIG. 3 is a schematic diagram showing signaling interactions in downlink transmission according to an embodiment of the present disclosure.

FIG. 3 is a schematic diagram showing signaling interactions in downlink transmission according to an embodiment of the present disclosure. As shown in FIG. 3, the electronic device 200 may be a spectrum management server in a core network, the transmitting end is an eNB, and the receiving end is a UE. First, the eNB transmits downlink data to the UE. Next, failed transmission occurs on the UE side. On the UE side, a cause of the failed downlink information transmission is analyzed to determine whether the cause of the failed downlink information transmission is a link quality cause or a non-link quality cause. Next, the UE transmits feedback information such as the NACK message for indicating the failed information transmission to the eNB. In addition, the UE also transmits failure cause information indicating the cause of the failed information transmission to the eNB. Next, the eNB forwards the failure cause information to the spectrum management server. Next, the acquisition unit 211 in the spectrum management server acquires the failure cause information.

If it is determined that the failure cause is the non-link quality cause, the generation unit 212 in the spectrum management server generates spectrum sensing parameter information, which is transmitted to the eNB through the communication unit 220. Next, the eNB adjusts a spectrum sensing parameter based on the received spectrum sensing parameter information.

According to the embodiment of the present disclosure, one bit of information may be used to indicate the failure cause information. For example, the link quality cause is indicated when a value of a certain bit is "1", and the non-link quality cause is indicated when the value of the certain bit is "0". In addition, the UE may transmit the failure cause information via a PUSCH (physical uplink shared channel) and/or a PUCCH (physical uplink control channel). For example, in a case where the UE is to transmit uplink data while transmitting the failure cause information, the UE may use the PUSCH to carry the uplink data, the NACK and the failure cause. In addition, in a case where the UE is not to transmit uplink data while transmitting the failure cause information, the UE may use the PUCCH to carry the uplink data, the NACK and the failure cause. Further, the UE may also use the PUSCH to carry the failure cause and use the PUCCH to carry the NACK to save the resource of the PUCCH.

According to an embodiment of the present disclosure, the non-link quality cause may include interference from a hidden node in the vicinity of the receiving end and interference from other operators or access mechanisms.

According to an embodiment of the present disclosure, the acquisition unit 211 of the electronic device 200 may further acquire hidden node information indicating whether a hidden node exists. In a case where the hidden node information indicates that the hidden node exists, an energy detection threshold of the transmitting end may be reduced based on the spectrum sensing parameter information generated by the generation unit 212, so that the hidden node is sensed by the transmitting end.

According to an embodiment of the present disclosure, the UE can determine not only whether the cause of the failed information transmission is the link quality cause or the non-link quality cause, but also whether the non-link quality cause is interference from a hidden node in the vicinity of the receiving end or from other operators or access mechanisms. The UE may detect whether the hidden node exists with methods known in the art, and then determine that the non-link quality cause is interference from which of the above two sources. For example, the UE may determine whether the hidden node exists by detecting a beacon of a Wifi communication system, or detecting a reference signal and a PLMN (Public Land Mobile Network) identifier from other operators. Of course, the UE may also detect whether the hidden node exists with other methods, which is not limited in the present disclosure.

According to an embodiment of the present disclosure, if the UE determines that the cause of the failed information transmission is the non-link quality cause, the UE may actively continue to determine whether the non-link quality cause is the interference from which of the two sources. Next, the UE may also transmit information indicating whether the hidden node exists in the vicinity of the UE to the eNB. In this case, two bits of information may be used to indicate the failure cause information. For example, the link quality cause is indicated if the values of certain two bits are "10", it is indicated if the values of the two bits are "00" that the hidden node exists in the vicinity of the UE, and it is indicated if the values of the two bits are "01" that no hidden node exists in the vicinity of the UE and the failure cause is interference from other operators or access mechanisms, and other causes are indicated if the values of the two bits are "11".

According to another embodiment of the present disclosure, in the downlink data transmission, if the UE determines that the cause of the failed information transmission is the non-link quality cause, the UE may only report to the eNB that the failure cause is the non-link quality cause, and wait for a further instruction from the eNB. In this case, the processing circuit 210 may transmit a command to the eNB through the communication unit 220 to instruct the UE to sense whether the hidden node exists in the vicinity of the UE after the spectrum management server receives the failure cause indicating the non-link quality cause. Next, the eNB forwards the command to the UE. Next, the UE continues to determine that the non-link quality cause is the interference from which of the two sources upon receiving the command. If the UE determines that a hidden node exists in the vicinity of the UE, the UE may transmit information indicating whether a hidden node exists in the vicinity of the UE to the eNB. In this case, one bit of information may be used to indicate whether a hidden node exists. For example, it is indicated that a hidden node exists if the value of the bit is "1"; and it is indicated that no hidden node exists if the value of the bit is "0".

According to an embodiment of the present disclosure, in a case where the failure cause indicates that the hidden node exists in the vicinity of the UE, the spectrum management server generates spectrum sensing parameter information for reducing an energy detection threshold of the eNB and transmits the reduced energy detection threshold to the eNB, so that the eNB can extend a range of energy detection and find the hidden node in the vicinity of the UE. After that, the eNB may also perform other operations. For example, the eNB may monitor the hidden node.

According to an embodiment of the present disclosure, in a case where the failure cause indicates that no hidden node exists in the vicinity of the UE, that is, the cause of the failed information transmission is interference from other operators or access mechanisms, the generation unit 212 of the processing circuit 210 generates spectrum sensing parameter information. The eNB increases a contention window size or a value of a counter based on the spectrum sensing parameter information.

According to an embodiment of the present disclosure, in a case where a contention window is configured on the eNB side, the spectrum management server may increase a contention window size of the eNB and transmit the increased contention window size to the eNB to reduce a probability that the eNB accesses to a certain frequency. In addition, in a case where a counter is configured on the eNB side, the spectrum management server may increase a value of the counter of the eNB and transmit the increased value of the counter to the eNB to reduce a probability that the eNB accesses to the certain frequency. The contention window size and the value of the counter herein indicate a waiting time period for the eNB to access to a certain frequency.

According to an embodiment of the present disclosure, the processing circuit 210 is further configured to generate a command to recover the spectrum sensing parameter of the transmitting end upon elapse of a preset time period in a case where a probability of successful information transmission between the transmitting end and the receiving end is increased.

After the spectrum sensing parameter of the eNB is adjusted, the eNB may continue data transmission with the UE. That is, for each successful information transmission, the UE feeds an ACK message indicating the successful information transmission back to the eNB. In addition, for each failed information transmission, the UE feeds a NACK message indicating the failed information transmission and a failure cause back to the eNB. The eNB may transmit the ACK/NACK message to the spectrum management server. Next, the spectrum management server may determine, based on the ACK/NACK message, whether a probability of successful information transmission between the eNB and the UE is increased. For example, during a preset time period, if a ratio of the number of the ACKs to a sum of the number of the ACKs and the number of the NACKs is greater than a preset threshold, the spectrum management server determines that the probability of the successful information transmission between the eNB and the UE is increased. In this case, the generation unit 220 of the processing circuit 210 may generate spectrum sensing parameter information to recover the spectrum sensing parameter of the eNB. For example, the energy detection threshold of the eNB may be increased, or the contention window size or the value of the counter of the eNB may be reduced.

According to another embodiment of the present disclosure, the processing circuit 210 is further configured to generate a command to recover the spectrum sensing parameter of the transmitting end upon elapse of a preset time period. In this case, the spectrum management server generates spectrum sensing parameter information upon elapse of a preset time period regardless of whether the probability of the successful information transmission between the eNB and the UE is increased, in order to recover the spectrum sensing parameter of the eNB.

According to an embodiment of the present disclosure, the processing circuit 210 is further configured to: acquire multiple NACK messages and multiple pieces of failure cause information during a preset time period; and determine the cause of the failed information transmission is the non-link quality cause based on a ratio of the number of pieces of failure cause information indicating that the cause of the failed information transmission is the non-link quality cause to the number of the NACK messages.

In this embodiment, data transmission may be performed between the eNB and the UE for multiple times. For each failed information transmission, the UE feeds one NACK message and one piece of failure cause information back to the eNB. That is, each NACK message corresponds to one cause. On the electronic device 200 side (for example, the analysis unit, which is not shown), the total number of NACK messages and the number of NACK messages indicating that the failure cause is the non-link quality cause during a time period may be counted, and a ratio of the number of the NACK messages indicating the non-link quality cause to the total number of the NACK messages may be calculated. Next, the electronic device 200 (for example, the analysis unit, which is not shown) determines whether the cause of the failed information transmission is the non-link quality cause based on the calculated ratio. For example, in a case where the ratio of the number of the NACK messages indicating the non-link quality cause to the total number of the NACK messages is greater than a first threshold, it is determined that the cause of the failed information transmission is the non-link quality cause. In addition, in a case where the ratio of the number of the NACK messages indicating the non-link quality cause to the total number of the NACK messages is less than or equal to the first threshold, it is determined that the cause of the failed information transmission is the link quality cause.

According to another embodiment of the present disclosure, the processing circuit 210 is further configured to: acquire multiple NACK messages and multiple pieces of the failure cause information as well as multiple ACK messages indicating successful information transmission between the transmitting end and the receiving end during a preset time period; and determine whether the cause of the failed information transmission is the non-link quality cause based on a ratio of the number of pieces of failure cause information indicating that the cause of the failed information transmission is the non-link quality cause to a sum of the number of the NACK messages and the number of the ACK messages.

In this embodiment, on the electronic device 200 side (for example, the analysis unit, which is not shown), the total number of the ACK messages, the total number of the NACK messages, and the number of the NACK messages indicating that the failure cause is the non-link quality cause during a time period may be counted, and a ratio of the number of the NACK messages indicating the non-link quality cause to a sum of the number of the NACK messages and the number of the ACK messages may be calculated. Next, the electronic device 200 (for example, the analysis unit, which is not shown) determines whether the cause of the failed information transmission is the non-link quality cause based on the calculated ratio. For example, in a case where the ratio of the number of the NACK messages indicating the non-link quality cause to the sum of the number of the NACK messages and the number of the ACK messages is greater than a second threshold, it is determined that the cause of the failed information transmission is the non-link quality cause. In addition, in a case where the ratio of the number of the NACK messages indicating the non-link quality cause to the sum of the number of the NACK messages and the number of the ACK messages is less than or equal to the second threshold, it is determined that the cause of the failed information transmission is the link quality cause.

According to an embodiment of the present disclosure, the electronic device 200 may determine, based on a ratio regarding the failure cause during a preset time period, that the failure cause is indeed the non-link quality cause, thereby avoiding inaccurate analysis of the cause on the UE side, so that analysis for the failure cause is accurate.

According to the above description, in the downlink transmission between the eNB and the UE, in a case where the cause of failed transmission is the non-link quality cause, the UE side can determine whether the non-link quality cause is interference from a hidden node in the vicinity of the UE or from other operators or access mechanisms. According to another embodiment of the present disclosure, in a case where the cause of the failed transmission is the non-link quality cause, the network side, i.e., the electronic device 200 side can also determine whether the cause of the failed information transmission is interference from which of the above two sources.

According to an embodiment of the present disclosure, the processing circuit 210 is further configured to: determine whether a hidden node exists based on a ratio of the number of pieces of the failure cause information indicating the non-link quality cause to a number of the NACK messages, or a ratio of the number of pieces of the failure cause information indicating the non-link quality cause to the sum of the number of the NACK messages and the number of the ACK messages. The transmitting end reduces an energy detection threshold based on the spectrum sensing parameter information in a case where the hidden node exists, so that the hidden node is sensed by the transmitting end. The transmitting end increases a contention window size or a value of a counter based on the spectrum sensing parameter information in a case where no hidden node exists.

According to an embodiment of the present disclosure, as described above, on the electronic device 200 side (for example, the analysis unit, which is not shown), the total number of the NACK messages and the number of NACK messages indicating that the failure cause is the non-link quality cause during a time period are counted, and a ratio of the number of NACK messages indicating the non-link quality cause to the total number of the NACK messages is calculated. Next, the electronic device 200 (for example, the analysis unit, which is not shown) determines whether the cause of the failed information transmission is a hidden node in the vicinity of the UE based on the calculated ratio. For example, in a case where the ratio of the number of the NACK messages indicating the non-link quality cause to the total number of the NACK messages is greater than a third threshold, it is determined that the cause of the failed information transmission is the hidden node in the vicinity of the UE. In addition, in a case where the ratio of the number of the NACK messages indicating the non-link quality cause to the total number of the NACK messages is greater than the first threshold and less than or equal to the third threshold, it is determined that the cause of the failed information transmission is interference from other operators or access mechanisms to the UE.

According to another embodiment of the present disclosure, as described above, on the electronic device 200 side (for example, the analysis unit, which not shown), the total number of the ACK messages, the total number of the NACK messages, and the number of NACK messages indicating that the failure cause is the non-link quality cause during a time period may be counted, and a ratio of the number of the NACK messages indicating the non-link quality cause to a sum of the number of the NACK messages and the number of the ACK messages may be calculated. Next, the electronic device 200 (for example, the analysis unit, which is not shown) determines whether the cause of the failed information transmission is the hidden node in the vicinity of the UE based on the calculated ratio. For example, in a case where the ratio of the number of the NACK messages indicating the non-link quality cause to the sum of the number of the NACK messages and the number of the ACK messages is greater than a fourth threshold, it is determined that the cause of the failed information transmission is the hidden node in the vicinity of the UE. In addition, in a case where the ratio of the number of the NACK messages indicating the non-link quality cause to the sum of the number of the NACK messages and the number of the ACK messages is greater than the second threshold and is less than or equal to the fourth threshold, it is determined that the cause of the failed information transmission is interference from other operators or access mechanisms to the UE.

In the present disclosure, multiple thresholds are set and exemplarily represented as a first threshold, a second threshold, a third threshold, a fourth threshold and the like. However, the "first", "second", "third "and" fourth" are only for identification rather than actual limitation, and may be set by a system designer according to actual needs. The first threshold and the third threshold are set for the ratio of the number of the NACK messages indicating the non-link quality cause to the total number of the NACK messages, where the first threshold is used to make a determination between the link quality cause and the non-link quality cause, and the third threshold is used to determine whether the hidden node exists. In addition, the second threshold and the fourth threshold are set for a ratio of the number of the NACK messages indicating the non-link quality cause to the sum of the total number of the NACK messages and the total number of the ACK messages, where the second threshold is used to make a determination between the link quality cause and the non-link quality cause, and the fourth threshold is used to determine whether the hidden node exists.

Further, in a case where the electronic device side 200 determines that the cause of the failed information transmission is the hidden node in the vicinity of the UE or interference from other operators or access mechanisms to the UE, operations performed on the electronic device 200 side are similar to operations performed on the UE side in a case where the cause is determined on the UE side. That is, in a case where the hidden node exists, the eNB reduces the energy detection threshold based on the spectrum sensing parameter information so that the hidden node is sensed by the eNB. In addition, in a case where no hidden node exists, the eNB increases the contention window size or the value of the counter based on the spectrum sensing parameter information.

Uplink Transmission

Figure 4:
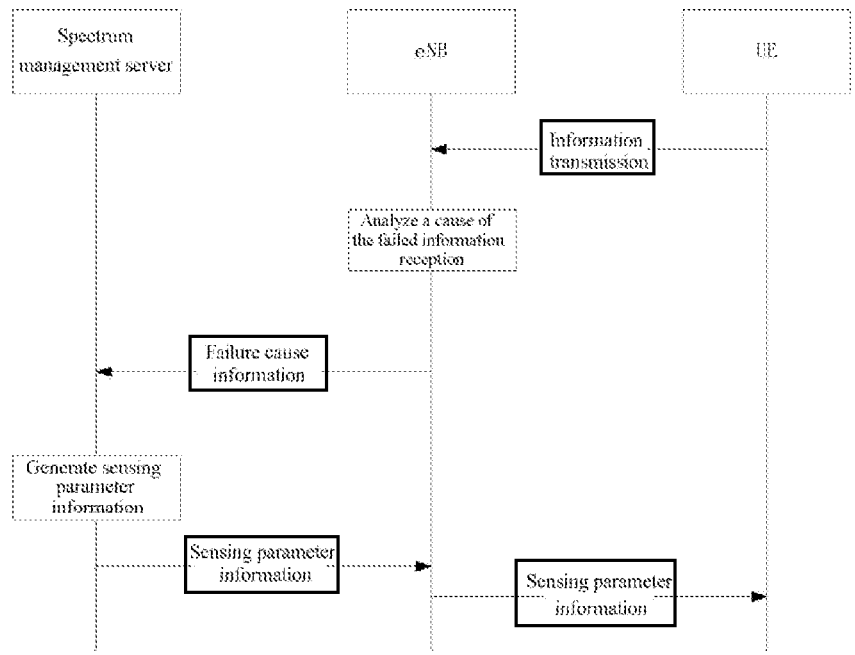
FIG. 4 is a schematic diagram showing signaling interactions in uplink transmission according to an embodiment of the present disclosure.

FIG. 4 is a schematic diagram showing signaling interactions in uplink transmission according to an embodiment of the present disclosure. As shown in FIG. 4, the electronic device 200 may be a spectrum management server in a core network, the transmitting end is a UE, and the receiving end is an eNB. First, the UE transmits uplink data to the eNB. Next, failed transmission occurs on the eNB side. On the eNB side, a cause of the failed uplink information transmission is analyzed to determine whether the cause of the failed uplink information transmission is the link quality cause or the non-link quality cause. Next, the eNB transmits failure cause information indicating the cause of the failed information transmission to the spectrum management server. Next, the acquisition unit 211 in the spectrum management server acquires the failure cause. If it is determined that the failure cause is the non-link quality cause, the generation unit 212 in the spectrum management server generates spectrum sensing parameter information and transmits the spectrum sensing parameter information to the eNB through the communication unit 220. Next, the eNB transmits the received spectrum sensing parameter information to the UE. Then, the UE adjusts a spectrum sensing parameter based on the received spectrum sensing parameter information.

According to an embodiment of the present disclosure, one bit of information may be used to indicate the failure cause information. For example, the link quality cause is indicated when a value of a certain bit is "1", and the non-link quality cause is indicated when the value of the certain bit is "0".

According to an embodiment of the present disclosure, the non-link quality cause may include interference from a hidden node in the vicinity of the receiving end and interference from other operators or access mechanisms.

According to an embodiment of the present disclosure, the acquisition unit 211 of the electronic device 200 may further acquire hidden node information indicating whether a hidden node exists. In a case where the hidden node information indicates that the hidden node exists, an energy detection threshold of the transmitting end may be reduced based on the spectrum sensing parameter information generated by the generation unit 212, so that the hidden node is sensed by the transmitting end.

According to an embodiment of the present disclosure, the eNB may determine not only whether the cause of the failed information transmission is the link quality cause or the non-link quality cause, but also whether the non-link quality cause is interference from a hidden node in the vicinity of the receiving end or interference from other operators or access mechanisms. The eNB may determine that the non-link quality cause is interference from which of above two sources by means of methods known in the art, such as an energy sensing method.

According to an embodiment of the present disclosure, if the eNB determines that the cause of the failed information transmission is the non-link quality cause, the eNB may actively continue to determine that the non-link quality cause is the interference from which of the two sources. Next, the eNB may also transmit information indicating whether the hidden node exists in the vicinity of the eNB to the spectrum management server. In this case, two bits of information may be used to indicate the failure cause information. For example, the link quality cause is indicated if the values of certain two bits are "10", it is indicated if the values of the two bits are "00" that the hidden node exists in the vicinity of the eNE, and it is indicated if the values of the two bits are "01" that no hidden node exists in the vicinity of the eNB and the failure cause is interference from other operators or access mechanisms, and other cause is indicated if the values of the two bits are "11".

According to another embodiment of the present disclosure, if the eNB determines that the cause of the failed information transmission is the non-link quality cause, the eNB may only report to the spectrum management server that the failure cause is the non-link quality cause, and wait for a further instruction from the spectrum management server. In this case, the processing circuit 210 may transmit a command to the eNB through the communication unit 220 to instruct the eNB to sense whether the hidden node exists in the vicinity of the eNB after the spectrum management server receives the failure cause indicating the non-link quality cause. Next, the eNB continues to determine that the non-link quality cause is the interference from which of the two sources upon receiving the command. If the eNB determines that the hidden node exists in the vicinity of the eNB, the eNB may transmit information indicating whether the hidden node exists in the vicinity of the eNB to the spectrum management server. In this case, one bit of information may be used to indicate whether the hidden node exists. For example, it is indicated that the hidden node exists if the value of the bit is "1"; and it is indicated that no hidden node exists if the value of the bit is "0".

According to an embodiment of the present disclosure, in a case where the failure cause indicates that the hidden node exists in the vicinity of the eNB, the spectrum management server generates spectrum sensing parameter information for reducing an energy detection threshold of the UE and transmits the reduced energy detection threshold to the eNB. The eNB then forwards the reduced energy detection threshold to the UE. Next, the UE performs adjustment to extend a range of energy detection, such that the hidden node in the vicinity of the eNB can be found.

According to an embodiment of the present disclosure, in a case where the failure cause indicates that no hidden node exists in the vicinity of the eNB, that is, the cause of the failed information transmission is interference from other operators or access mechanisms, the generation unit 212 of the processing circuit 210 generates spectrum sensing parameter information. A contention window size or a value of a counter of UE is increased based on the spectrum sensing parameter information.

According to an embodiment of the present disclosure, in a case where a contention window is configured on the UE side, the spectrum management server may increase a contention window size of the UE and transmit the increased contention window size to the eNB. The eNB then forwards the increased contention window size to the UE to reduce a probability that the UE accesses to a certain frequency. In addition, in a case where a counter is configured on the UE side, the spectrum management server may increase a value of the counter of the UE and transmit the increased value of the counter to the eNB. The eNB then forwards the increased value of the counter to the UE to reduce a probability that the UE accesses to the certain frequency. The contention window size and the value of the counter herein indicate a waiting time period for the UE to access into a certain frequency.

According to the embodiment of the present disclosure, the processing circuit 210 is further configured to generate a command to recover the spectrum sensing parameter of the transmitting end upon elapse of a preset time period in a case where a probability of successful information transmission between the transmitting end and the receiving end is increased.

After the spectrum sensing parameter of the UE is adjusted, the UE may continue data transmission with the eNB. That is, for each successful uplink information transmission, the eNB generates an ACK message. In addition, for each failed uplink information transmission, the eNB generates a NACK message and analyzes a cause of the failed transmission. The eNB may then transmit the ACK/NACK messages and the failure causes to the spectrum management server. Next, the spectrum management server may determine, based on the ACK/NACK messages, whether a probability of successful information transmission between the UE and the eNB is increased. For example, during a preset time period, if a ratio of the number of the ACK messages to a sum of the number of the ACK messages and the number of the NACK messages is greater than a preset threshold, the spectrum management server determines that the probability of the successful information transmission between the UE and the eNB is increased. In this case, the generation unit 212 of the processing circuit 210 may generate spectrum sensing parameter information to recover the spectrum sensing parameter of the UE. For example, the energy detection threshold of the UE may be increased, or the contention window size or the value of the counter of the UE may be reduced.

According to another embodiment of the present disclosure, the processing circuit 210 is further configured to generate a command to recover the spectrum sensing parameter of the transmitting end upon elapse of a preset time period. In this case, the spectrum management server generates spectrum sensing parameter information for recovering the spectrum sensing parameter of the UE upon elapse of a preset time period regardless of whether the probability of the successful information transmission between the UE and the eNB is increased.

According to an embodiment of the present disclosure, the processing circuit 210 is further configured to: acquire multiple NACK messages and multiple pieces of failure cause information during a preset time period; and determine whether the cause of failed information transmission is the non-link quality cause based on a ratio of the number of pieces of failure cause information indicating that the cause of the failed information transmission is the non-link quality cause to the number of the NACK messages.

In this embodiment, data transmission may be performed between the UE and the eNB for multiple times. For each failed information transmission, the eNB not only feeds the NACK message back to the UE, but also feeds the NACK message and the failure cause information back to the spectrum management server. In addition, for each successful information transmission, the eNB not only feeds the ACK message back to the UE, but also feeds the ACK message back to the spectrum management server. On the electronic device 200 side (for example, the analysis unit, which is not shown), the total number of the NACK messages and the number of the NACK messages indicating that the failure cause is the non-link quality cause during a time period may be counted, and a ratio of the number of the NACK messages indicating the non-link quality cause to the total number of the NACK messages may be calculated. Next, the electronic device 200 (for example, the analysis unit, which is not shown) determines whether the cause of the failed information transmission is the non-link quality cause based on the calculated ratio. For example, in a case where the ratio of the number of the NACK messages indicating the non-link quality cause to the total number of the NACK messages is greater than a first threshold, it is determined that the cause of the failed information transmission is the non-link quality cause. In addition, in a case where the ratio of the number of the NACK messages indicating the non-link quality cause to the total number of the NACK messages is less than or equal to the first threshold, it is determined that the cause of the failed information transmission is the link quality cause.

According to another embodiment of the present disclosure, the processing circuit 210 is further configured to: acquire multiple NACK messages and multiple pieces of the failure cause information as well as multiple ACK messages indicating successful information transmission between the transmitting end and the receiving end during a preset time period; and determine whether the cause of the failed information transmission is the non-link quality cause based on a ratio of the number of pieces of failure cause information indicating that the cause of the failed information transmission is the non-link quality cause to a sum of the number of the NACK messages and the number of the ACK messages.

In this embodiment, on the electronic device 200 side (for example, the analysis unit, which is not shown), the total number of the ACK messages, the total number of the NACK messages, and the number of NACK messages indicating that the failure cause is the non-link quality cause during a time period may be counted, and a ratio of the number of the NACK messages indicating the non-link quality cause to a sum of the total number of the NACK messages and the total number of the ACK messages may be calculated. Next, the electronic device 200 (for example, the analysis unit, which is not shown) determines whether the cause of the failed information transmission is the non-link quality cause based on the calculated ratio. For example, in a case where the ratio of the number of the NACK messages indicating the non-link quality cause to the sum of the total number of the NACK messages and the total number of the ACK messages is greater than a second threshold, it is determined that the cause of the failed information transmission is the non-link quality cause. In addition, in a case where the ratio of the number of the NACK messages indicating the non-link quality cause to the sum of the total number of the NACK messages and the total number of the ACK messages is less than or equal to the second threshold, it is determined that the cause of the failed information transmission is the link quality cause.

According to an embodiment of the present disclosure, the electronic device 200 may determine, based on a ratio regarding the failure cause during a preset time period, that the failure cause is indeed the non-link quality cause, thereby avoiding inaccurate analysis of the cause on the eNB side, so that analysis for the failure cause is accurate.

According to the above description, in the downlink transmission between the eNB and the UE, in a case where the cause of failed transmission is the non-link quality cause, the eNB side can determine whether the non-link quality cause is interference from a hidden node in the vicinity of the eNB or from other operators or access mechanisms. According to another embodiment of the present disclosure, in a case where the cause of the failed transmission is the non-link quality cause, the network side, i.e., the electronic device 200 side can also determine whether the cause of the failed information transmission is interference from which of the above two sources.

According to an embodiment of the present disclosure, the processing circuit 210 is further configured to: determine whether a hidden node exists based on a ratio of the number of pieces of the failure cause information indicating the non-link quality cause to a sum of the number of the NACK messages, or a ratio of the number of the NACK messages indicating the non-link quality cause to the sum of the number of the NACK messages and the number of the ACK messages. The transmitting end reduces an energy detection threshold based on the spectrum sensing parameter information in a case where the hidden node exists, so that the hidden node is sensed by the transmitting end. The transmitting end increases a contention window size or a value of a counter based on the spectrum sensing parameter information in a case where no hidden node exists.

According to an embodiment of the present disclosure, as described above, on the electronic device 200 side (for example, the analysis unit, which is not shown), the total number of the NACK messages and the number of NACK messages indicating that the failure cause is the non-link quality cause during a time period are counted, and a ratio of the number of the NACK messages indicating the non-link quality cause to the total number of the NACK messages is calculated. Next, the electronic device 200 (for example, the analysis unit, which is not shown) determines whether the cause of the failed information transmission is a hidden node in the vicinity of the eNB based on the calculated ratio. For example, in a case where the ratio of the number of the NACK messages indicating the non-link quality cause to the total number of the NACK messages is greater than a third threshold, it is determined that the cause of the failed information transmission is the hidden node in the vicinity of the eNB. In addition, in a case where the ratio of the number of the NACK messages indicating the non-link quality cause to the total number of the NACK messages is greater than the first threshold and less than or equal to the third threshold, it is determined that the cause of the failed information transmission is interference from other operators or access mechanisms to the eNB.

According to another embodiment of the present disclosure, as described above, on the electronic device 200 side (for example, the analysis unit, which not shown), the total number of the ACK messages, the total number of the NACK messages, and the number of the NACK messages indicating that the failure cause is the non-link quality cause during a time period may be counted, and a ratio of the number of the NACK messages indicating the non-link quality cause to a sum of the total number of the NACK messages and the total number of the ACK messages may be calculated. Next, the electronic device 200 (for example, the analysis unit, which is not shown) determines whether the cause of the failed information transmission is the hidden node in the vicinity of the eNB based on the calculated ratio. For example, in a case where the ratio of the number of the NACK messages indicating the non-link quality cause to the sum of the total number of the NACK messages and the total number of the ACK messages is greater than a fourth threshold, it is determined that the cause of the failed information transmission is the hidden node in the vicinity of the eNB. In addition, in a case where the ratio of the number of the NACK messages indicating the non-link quality cause to the sum of the total number of the NACK messages and the total number of the ACK messages is greater than the second threshold and is less than or equal to the fourth threshold, it is determined that the cause of the failed information transmission is interference from other operators or access mechanisms to the eNB.

Further, in a case where the electronic device side 200 determines that the cause of the failed information transmission is the hidden node in the vicinity of the eNB or interference from other operators or access mechanisms to the eNB, operations performed on the electronic device 200 side are similar to operations performed on the eNB side in a case where the cause is determined on the eNB side. That is, in a case where the hidden node exists, the UE reduces the energy detection threshold based on the spectrum sensing parameter information so that the hidden node is sensed by the UE. In addition, in a case where no hidden node exists, the UE increases the contention window size or the value of the counter based on the spectrum sensing parameter information.

As described above, with the electronic device 200 according to the present disclosure, whether the cause of failed information transmission between the transmitting end and the receiving end is the link quality cause or the non-link quality cause may be determined. In addition, whether the non-link quality cause is the hidden node in the vicinity of the receiving end or interference from other operators or access mechanisms may further be determined by the electronic device 200, and operations may be performed based on the cause of the failed information transmission, thereby greatly increasing the probability of successful information transmission between the transmitting end and the receiving end. Further, adjustment of the spectrum sensing parameter in a case where the cause of the failed information transmission is the link quality cause can be avoided.

Figure 5:
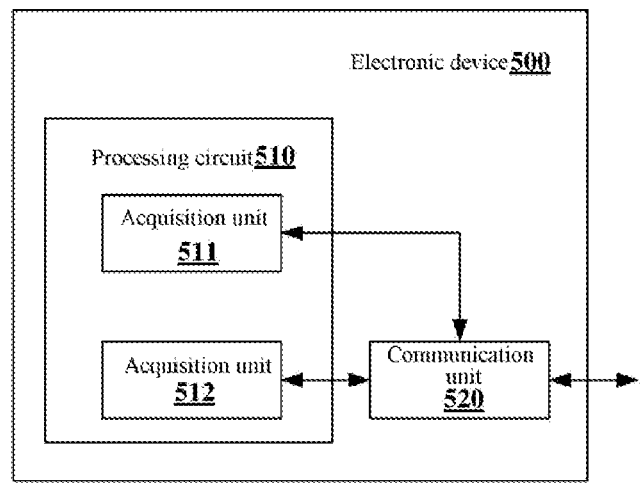
FIG. 5 is a block diagram showing a structure of an electronic device in a wireless communication system according to another embodiment of the present disclosure.

FIG. 5 is a block diagram showing a structure of an electronic device in a wireless communication system according to another embodiment of the present disclosure.

As shown in FIG. 5, an electronic device 500 may include a processing circuit 510. It should be noted that the electronic device 500 may include one processing circuit 510 or multiple processing circuits 510. In addition, the electronic device 500 may further include a communication unit 520 such as a transceiver.

Similarly, the processing circuit 510 may also include various discrete functional units to perform various different functions and/or operations as mentioned above. The functional units may be physical entities or logical entities, and units referred to by different names may be implemented as a same physical entity.

For example, as shown in FIG. 5, the processing circuit 510 may include an acquisition unit 511 and an acquisition unit 512.

The acquisition unit 511 may acquire a NACK message indicating failed information transmission between a transmitting end and a receiving end in the wireless communication system and failure cause information indicating a cause of the failed information transmission, to inform a spectrum management server in the wireless communication system, wherein the cause of the failed information transmission includes a link quality cause and a non-link quality cause.

The acquisition unit 512 may acquire spectrum sensing parameter information from the spectrum management server to adjust a spectrum sensing parameter of the transmitting end, so as to increase a probability of successful information transmission between the transmitting end and the receiving end.

Preferably, the processing circuit 510 may be further configured to, before acquiring the spectrum sensing parameter information from the spectrum management server, acquire hidden node information indicating whether a hidden node exists, to inform the spectrum management server.

Preferably, the electronic device 500 may be located on a side of the transmitting end, and the processing circuit 510 may acquire the NACK message, the failure cause information and the hidden node information from the receiving end.

Preferably, the processing circuit 510 may be further configured to perform, based on the spectrum sensing parameter information, at least one of: reducing an energy detection threshold of the transmitting end so that the hidden node is sensed by the transmitting end; and increasing a contention window size or a value of a counter of the transmitting end.

Preferably, the electronic device 500 may be a base station in the wireless communication system.

Preferably, the electronic device 500 may be located on a side of the receiving end, and for acquiring the NACK message and the failure cause information, the processing circuit 510 may be further configured to: generate the NACK message when the failed information transmission occurs; detect a value of a reference signal received power RSRP of a communication link between the receiving end and the transmitting end; detect an interference value of an interference signal from a neighbor cell; and generate the failure cause information based on the value of the RSRP and the interference value.

According to an embodiment of the present disclosure, the electronic device 500 being located on the side of the receiving end indicates that the UE performs uplink data transmission with the eNB. The eNB may determine whether the cause of the failed information transmission is the link quality cause or the non-link quality cause, as mentioned above. In this embodiment, the eNB may detect the value of the RSRP between the receiving end and the transmitting end and the interference value of the interference signal from the neighbor cell. Next, the eNB generates the failure cause information based on the value of the RSRP and the interference value.

In this embodiment, the eNB may detect a value of a physical layer RSRP and a value of a network layer RSRP during a process of detecting the value of the RSRP between the receiving end and the transmitting end. Great values of the physical layer RSRP and the network layer RSRP indicate that the quality of the link between the eNB and the UE is good, while small values of the physical layer RSRP and the network layer RSRP indicate that the quality of the link between the eNB and the UE is poor.

In this embodiment, the eNB may also detect the interference value of the interference signal from the neighbor cell and determine whether the neighbor cell and the eNB belong to a same operator, for example, by detecting a PLMN identifier of the neighbor cell. If the neighbor cell and the eNB belong to a same operator and the interference value of the interference signal from the neighbor cell is small, it is indicated that the interference from the same operator to the eNB is weak. In addition, if the neighbor cell and the eNB belong to a same operator and the interference value of the interfering signal from the neighbor cell is great, it is indicated that the interference from the same operator to the eNB is strong. The eNB may detect the interference signal from the neighbor cell and detect the value of the RSRP between the receiving end and the transmitting end with a technology known in the art.

According to the embodiment of the present disclosure, for generating the failure cause information based on the value of the RSRP and the interference value, the processing circuit 510 is further configured to: generate failure cause information indicating that the cause of the failed information transmission is the non-link quality cause in a case where the value of the RSRP is greater than a first threshold and the interference value is less than a second threshold; and generate failure cause information indicating that the cause of the failed information transmission is the link quality cause in a case where the value of the RSRP is less than or equal to the first threshold and/or the interference value is greater than or equal to the second threshold.

In this embodiment, if the value of the RSRP is greater than the first threshold and the interference value is less than the second threshold, it is indicated that the quality of the link between the eNB and the UE is good and the interference from the same operator is weak. In this case, if failed information transmission occurs on the eNB side, the failure cause is the non-link quality cause. In addition, if the value of the RSRP is less than or equal to the first threshold and/or the interference value is greater than or equal to the second threshold, it is indicated that the quality of the link between the eNB and the UE is poor or the interference from the same operator to the eNB is strong. In this case, the failure cause is the link quality cause.

Preferably, for acquiring the hidden node information, the processing circuit 510 may be further configured to: sense whether a hidden node exists in the vicinity of the receiving end; and generate the hidden node information based on a sensed result.

Figure 6:
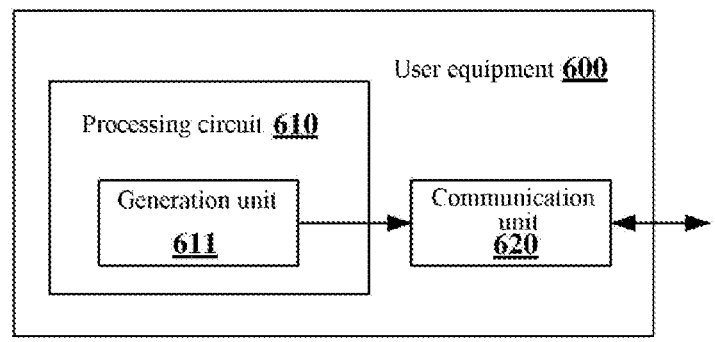
FIG. 6 is a block diagram showing a structure of a user equipment in a wireless communication system according to an embodiment of the present disclosure.

Next, a user equipment in the wireless communication system is described in detail. FIG. 6 shows a structure of a user equipment 600 in a wireless communication system according to an embodiment of the present disclosure. The user equipment 600 operates as a receiving end, that is, an eNB performs downlink data transmission with the user equipment 600.

As shown in FIG. 6, the user equipment 600 may include a processing circuit 610. It should be noted that the user equipment 600 may include one processing circuit 610 or multiple processing circuits 610. In addition, the user equipment 600 may further include a communication unit 620 such as a transceiver.

Similarly, the processing circuit 610 may also include various discrete functional units to perform various different functions and/or operations as mentioned above. The functional units may be physical entities or logical entities, and units referred to by different names may be implemented as a same physical entity.

For example, as shown in FIG. 6, the processing circuit 610 may include a generation unit 611.

The generation unit 611 may generate a NACK message indicating failed information transmission between a base station as a transmitting end and the user equipment 600 in the wireless communication system and failure cause information indicating a cause of the failed information transmission. The cause of the failed information transmission may include a link quality cause and a non-link quality cause.

The communication unit 620 may transmit the NACK message and the failure cause information to the base station, to inform a spectrum management server in the wireless communication system.

Preferably, the processing circuit 610 may be further configured to, if it is determined that the cause of the failed information transmission is the non-link quality cause, sense whether a hidden node exists in the vicinity of the user equipment 600; generate, based on a sensed result, hidden node information indicating whether the hidden node exists; and control the communication unit 620 to transmit the hidden node information to the base station, to inform the spectrum management server.

Preferably, for generating the NACK message and the failure cause information, the processing circuit 610 may further be configured to: generate the NACK message when the failed information transmission occurs; detect a value of a reference signal received power RSRP of a communication link between the base station and the user equipment 600; detect an interference value of an interference signal from a neighbor cell; and generate the failure cause information based on the value of the RSRP and the interference value.

As mentioned above, the UE may determine whether the cause of the failed information transmission is the link quality cause or the non-link quality cause. In this embodiment, the UE may detect the value of the RSRP between the receiving end and the transmitting end and detect the interference value of the interference signal from the neighbor cell. Next, the UE may generate the failure cause information based on the value of the RSRP and the interference value.

In this embodiment, the UE may detect a value of a physical layer RSRP and a value of a network layer RSRP during a process of detecting the value of the RSRP between the receiving end and the transmitting end. Great values of the physical layer RSRP and the network layer RSRP indicate that the quality of the link between the eNB and the UE is good, while small values of the physical layer RSRP and the network layer RSRP indicate that the quality of the link between the eNB and the UE is poor.

In this embodiment, the UE may also detect the interference value of the interference signal from the neighbor cell and determine whether the neighbor cell and the UE belong to a same operator, for example, by detecting a PLMN (Public Land Mobile Network) identifier of the neighbor cell. If the neighbor cell and the UE belong to a same operator and the interference value of the interference signal from the neighbor cell is small, it is indicated that the interference from the same operator to the UE is weak. In addition, if the neighbor cell and the UE belong to a same operator and the interference value of the interfering signal from the neighbor cell is great, it is indicated that the interference from the same operator to the UE is strong. The UE may detect the interference signal from the neighbor cell and detect the value of the RSRP between the receiving end and the transmitting end with a technology known in the art.

Preferably, for generating the failure cause information based on the value of the RSRP and the interference value, the processing circuit 610 is further configured to: generate failure cause information indicating that the cause of the failed information transmission is the non-link quality cause in a case where the value of the RSRP is greater than a first threshold and the interference value is less than a second threshold; and generate failure cause information indicating that the cause of the failed information transmission is the link quality cause in a case where the value of the RSRP is less than or equal to the first threshold and/or the interference value is greater than or equal to the second threshold.

In this embodiment, if the value of the RSRP is greater than the first threshold and the interference value is less than the second threshold, it is indicated that the quality of the link between the eNB and the UE is good and the interference from the same operator is weak. In this case, if failed information transmission occurs on the UE side, the failure cause is the non-link quality cause. In addition, if the value of the RSRP is less than or equal to the first threshold and/or the interference value is greater than or equal to the second threshold, it is indicated that the quality of the link between the eNB and the UE is poor or the interference from the same operator to the UE is strong. In this case, the cause of the failed information transmission is the link quality cause.

Figure 7:
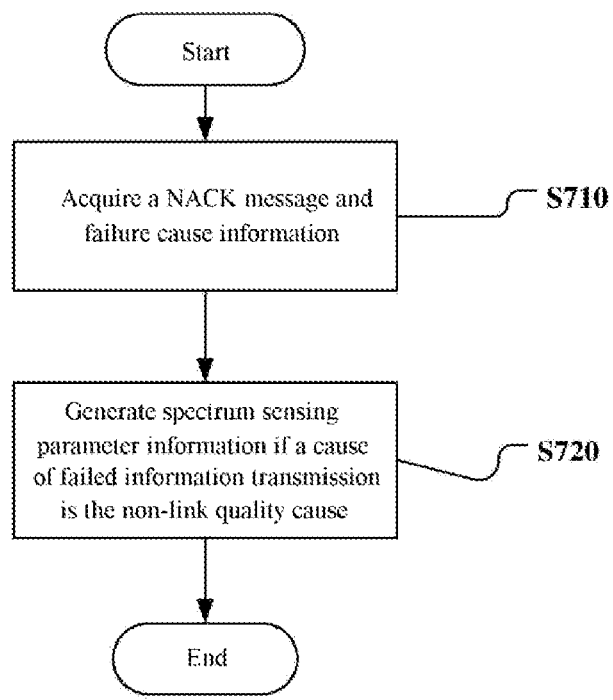
FIG. 7 is a flowchart of a method for performing wireless communication according to an embodiment of the present disclosure.

FIG. 7 is a flowchart of a method for performing wireless communication according to an embodiment of the present disclosure. As shown in FIG. 7, in step S710, a NACK message indicating failed information transmission between a transmitting end and a receiving end in a wireless communication system and failure cause information indicating a cause of the failed information transmission are acquired. The cause of the failed information transmission includes a link quality cause and a non-link quality cause.

Next, in step S720, if it is determined that the cause of the failed information transmission is the non-link quality cause, spectrum sensing parameter information is generated to adjust a spectrum sensing parameter of the transmitting end, so as to increase a probability of successful information transmission between the transmitting end and the receiving end.

Preferably, the generating the spectrum sensing parameter information may include: acquiring hidden node information indicating whether a hidden node exists, and enabling the spectrum sensing parameter information to be used for reducing an energy detection threshold of the transmitting end in a case where the hidden node information indicates that a hidden node exists, such that the hidden node is sensed by the transmitting end.

Preferably, before acquiring the hidden node information, the method may further include: generating a command to instruct the receiving end to sense whether a hidden node exists in the vicinity of the receiving end.

Preferably, in a case where the hidden node information indicates that no hidden node exists, the method may further include: enabling the spectrum sensing parameter information to be used for increasing a contention window size or a value of a counter of the transmitting end.

Preferably, the method may further include: generating a command to recover the spectrum sensing parameter of the transmitting end upon elapse of a preset time period in a case where the probability of successful information transmission between the transmitting end and the receiving end is increased.

Preferably, the determining whether the cause of the failed information transmission is a non-link quality cause may include: acquiring multiple NACK messages and multiple pieces of failure cause information during a preset time period; and determining whether the cause of the failed information transmission is the non-link quality cause based on a ratio of the number of pieces of failure cause information indicating that the cause of the failed information transmission is the non-link quality cause to the number of the NACK messages.

Preferably, the determining whether the cause of the failed information transmission is the non-link quality cause may include: acquiring multiple NACK messages and multiple pieces of failure cause information as well as multiple ACK messages indicating successful information transmission between the transmitting end and the receiving end during a preset time period; and determining whether the cause of the failed information transmission is the non-link quality cause based on a ratio of the number of pieces of failure cause information indicating that the cause of the failed information transmission is the non-link quality cause to a sum of the number of the NACK messages and the number of the ACK messages.

Preferably, if it is determined the cause of the failed information transmission is the non-link quality cause, the method may further include: determining whether a hidden node exists based on a ratio of the number of pieces of failure cause information indicating that the cause of the failed information transmission is the non-link quality cause to the number of the NACK messages or a ratio of the number of pieces of failure cause information indicating that the cause of the failed information transmission is the non-link quality cause to a sum of the number of the NACK messages and the number of the ACK messages; enabling the spectrum sensing parameter information to be used for reducing an energy detection threshold of the transmitting end if the hidden node exists, such that the hidden node is sensed by the transmitting end; and enabling the spectrum sensing parameter information to be used for increasing a contention window size or a value of a counter of the transmitting end if a hidden node does not exist.

Preferably, the method may be performed by a spectrum management server in a core network.

Figure 8:
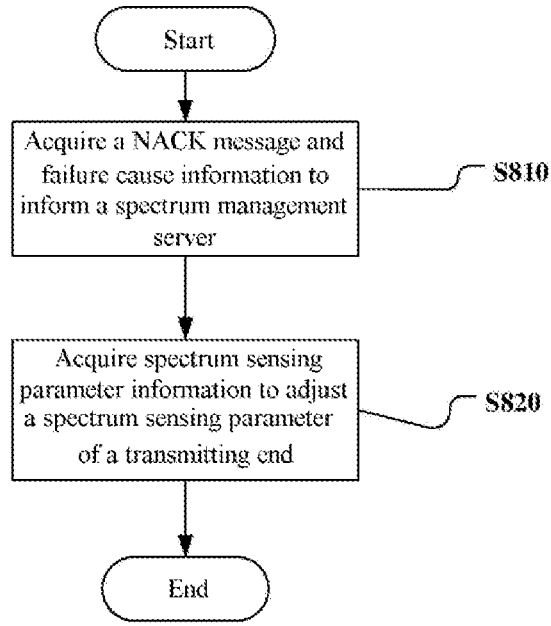
FIG. 8 is a flowchart of a method for performing wireless communication according to another embodiment of the present disclosure.

FIG. 8 is a flowchart of a method for performing wireless communication according to another embodiment of the present disclosure. As shown in FIG. 8, in step S810, a NACK message indicating failed information transmission between a transmitting end and a receiving end in a wireless communication system and failure cause information indicating a cause of the failed information transmission are acquired to inform a spectrum management server in the wireless communication system. The cause of the failed information transmission includes a link quality cause and a non-link quality cause.

In step S820, spectrum sensing parameter information is acquired from the spectrum management server to adjust a spectrum sensing parameter of the transmitting end, so as to increase a probability of successful information transmission between the transmitting end and the receiving end.

Preferably, before acquiring the spectrum sensing parameter information from the spectrum management server, the method may further include: acquiring hidden node information indicating whether a hidden node exists, to inform the spectrum management server.

Preferably, downlink data transmission is performed in the wireless communication system, and the method may further include acquiring the NACK message, the failure cause information and the hidden node information from the receiving end.

Preferably, the method may further include performing, based on the spectrum sensing parameter information, at least one of: reducing an energy detection threshold of the transmitting end so that the hidden node is sensed by the transmitting end; and increasing a contention window size or a value of a counter of the transmitting end.

Preferably, uplink data transmission is performed in the wireless communication system, and the acquiring the NACK message and the failure cause information may include: generating the NACK message when failed information transmission occurs; detecting a value of a reference signal received power RSRP of a communication link between the receiving end and the transmitting end; detecting an interference value of an interference signal from a neighbor cell; and generating the failure cause information based on the value of the RSRP and the interference value.

Preferably, the generating the failure cause information based on the value of the RSRP and the interference value may include: generating failure cause information indicating that the cause of the failed information transmission is the non-link quality cause in a case where the value of the RSRP is greater than a first threshold and the interference value is less than a second threshold; and generating failure cause information indicating that the cause of the failed information transmission is the link quality cause in a case where the value of the RSRP is less than or equal to the first threshold and/or the interference value is greater than or equal to the second threshold.

Preferably, the acquiring the hidden node information may include: sensing whether a hidden node exists in the vicinity of the receiving end; and generating the hidden node information based on a sensed result.

Preferably, the method may be performed by a base station in the wireless communication system.

Figure 9:
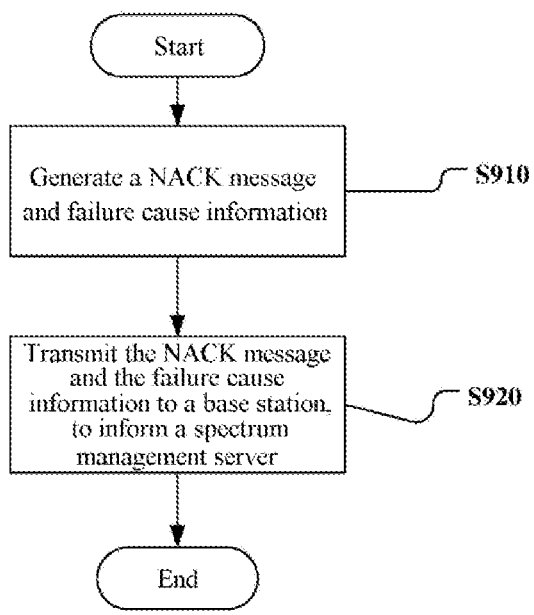
FIG. 9 is a flowchart of a method for performing wireless communication according to another embodiment of the present disclosure.

FIG. 9 is a flowchart of a method for performing wireless communication according to another embodiment of the present disclosure. As shown in FIG. 9, in step S910, a NACK message indicating failed information transmission between a base station serving as a transmitting end and a user equipment serving as a receiving end in the wireless communication system and failure cause information indicating a cause of the failed information transmission are generated. The cause of the failed information transmission includes a link quality cause and a non-link quality cause.

In step S920, the NACK message and the failure cause information are transmitted to the base station, to inform a spectrum management server in the wireless communication system.

Preferably, the determining whether the cause of the failed information transmission is a non-link quality cause may include: sensing whether a hidden node exists in the vicinity of the user equipment; generating, based on a sensed result, hidden node information indicating whether a hidden node exists; and transmitting the hidden node information to the base station, to inform the spectrum management server.

Preferably, the generating the NACK message and the failure cause information may include: generating the NACK message when the failed information transmission occurs; detecting a value of a reference signal received power RSRP of a communication link between the base station and the user equipment; detecting an interference value of an interference signal from a neighbor cell; and generating the failure cause information based on the value of the RSRP and the interference value.

Preferably, the generating the failure cause information based on the value of the RSRP and the interference value may include: generating failure cause information indicating that the cause of the failed information transmission is the non-link quality cause in a case where the value of the RSRP is greater than a first threshold and the interference value is less than a second threshold; and generating failure cause information indicating that the cause of the failed information transmission is the link quality cause in a case where the value of the RSRP is less than or equal to the first threshold and/or the interference value is greater than or equal to the second threshold.

Various implementations of the above-described steps of a method for performing wireless communication in a wireless communication system according to the embodiment of the present disclosure are described above in detail, and are not repeated herein.

The technology according to the present disclosure can be applied to various types of products. For example, the base station mentioned in the present disclosure may be implemented as any type of evolution Node B (eNB), such as a macro eNB and a small eNB. The small eNB may be an eNB covering a cell smaller than a macro cell, such as a pico eNB, a micro eNB or a home (femto) eNB. Alternatively, the base station may be implemented as any other type of base station, such as a NodeB and a base transceiver station (BTS). The base station may include: a main body (also referred to as a base station apparatus) configured to control wireless communication; and one or more remote radio heads (RRH) arranged at positions different from the main body. In addition, various types of terminals described below may operate as a base station by performing functions of the base station temporarily or in a semi-persistent manner.

For example, the UE mentioned in the present disclosure may be implemented as a mobile terminal (such as a smartphone, a tablet personal computer (PC), a notebook PC, a portable game terminal, a portable/dongle mobile router and a digital camera device) or an in-vehicle terminal (such as a car navigation apparatus). The UE may also be implemented as a terminal (also referred to as a machine-type communication (MTC) terminal) performing machine to machine (M2M) communication. In addition, the UE may be a wireless communication module (such as an integrated circuit module including a single chip) installed on each of the above terminals.

Figure 10:
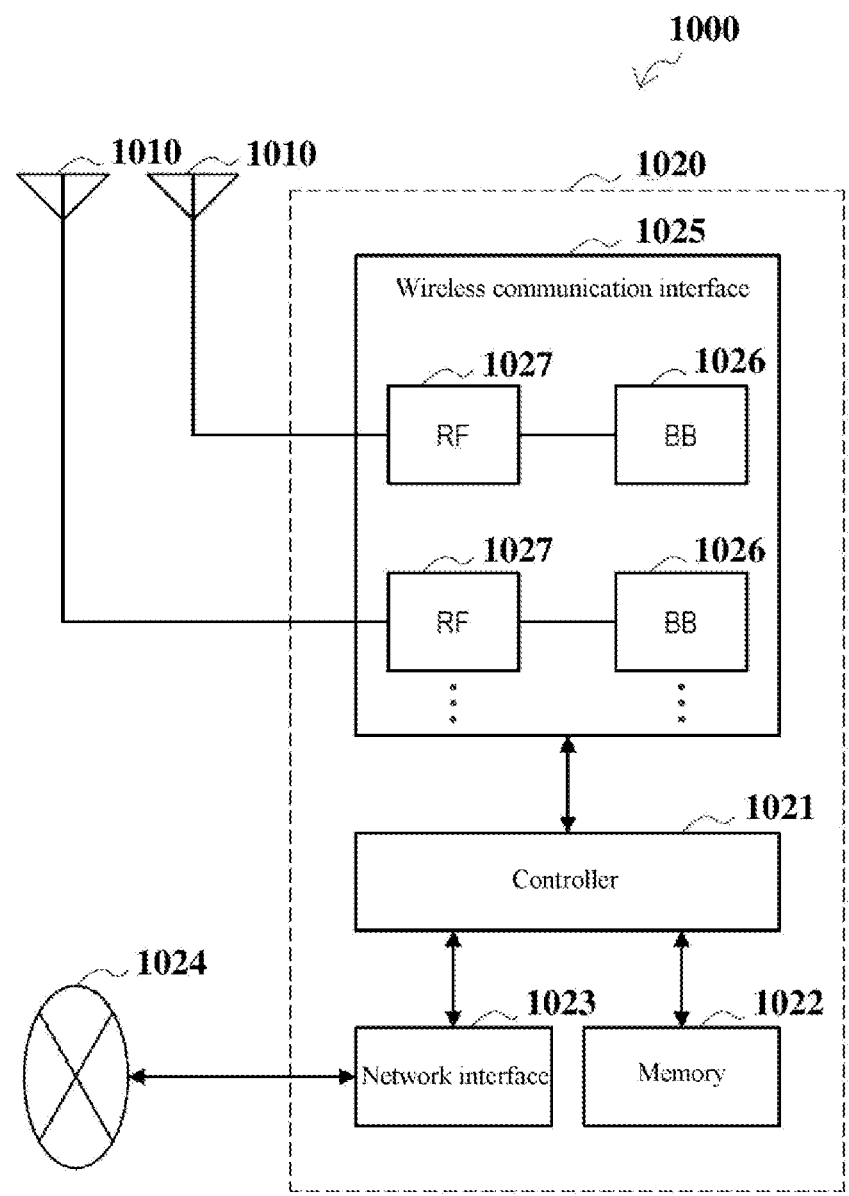
FIG. 10 is a block diagram showing a first schematic configuration example of an eNB (evolution node base station) to which the present disclosure may be applied.

FIG. 10 is a block diagram showing a first schematic configuration example of an eNB to which the technology of the present disclosure may be applied. An eNB 1000 includes one or more antennas 1010 and a base station apparatus 1020. Each antenna 1010 and the base station apparatus 1020 may be connected to each other via an RF cable.

Each of the antennas 1010 includes a single or multiple antenna elements (such as multiple antenna elements included in an MIMO antenna), and is used for the base station apparatus 1020 to transmit and receive radio signals. As shown in FIG. 10, the eNB 1000 may include the multiple antennas 1010. For example, the multiple antennas 1010 may be compatible with multiple frequency bands used by the eNB 1000. Although FIG. 10 shows the example in which the eNB 1000 includes the multiple antennas 1010, the eNB 1000 may also include a single antenna 1010.

The base station apparatus 1020 includes a controller 1021, a memory 1022, a network interface 1023, and a wireless communication interface 1025.

The controller 1021 may be, for example, a CPU or a DSP, and operates various functions of a higher layer of the base station apparatus 1020. For example, the controller 1021 generates a data packet from data in signals processed by the wireless communication interface 1025, and transfers the generated packet via the network interface 1023. The controller 1021 may bundle data from multiple base band processors to generate the bundled packet, and transfer the generated bundled packet. The controller 1021 may have logical functions of performing control such as radio resource control, radio bearer control, mobility management, admission control and scheduling. The control may be performed in corporation with an eNB or a core network node in the vicinity. The memory 1022 includes a RAM and a ROM, and stores a program executed by the controller 1021, and various types of control data (such as a terminal list, transmission power data, and scheduling data).

The network interface 1023 is a communication interface for connecting the base station apparatus 1020 to a core network 1024. The controller 1021 may communicate with a core network node or another eNB via the network interface 1023. In that case, the eNB 1000, and the core network node or the other eNB may be connected to each other through a logical interface (such as an S1 interface and an X2 interface). The network interface 1023 may also be a wired communication interface or a wireless communication interface for wireless backhaul. If the network interface 1023 is a wireless communication interface, the network interface 1023 may use a higher frequency band for wireless communication than a frequency band used by the wireless communication interface 1025.

The wireless communication interface 1025 supports any cellular communication scheme (such as Long Term Evolution (LTE) and LTE-Advanced), and provides wireless connection to a terminal positioned in a cell of the eNB 1000 via the antenna 1010. The wireless communication interface 1025 may typically include, for example, a baseband (BB) processor 1026 and an RF circuit 1027. The BB processor 1026 may perform, for example, encoding/decoding, modulating/demodulating, and multiplexing/demultiplexing, and performs various types of signal processing of layers (such as L1, medium access control (MAC), wireless link control (RLC), and a packet data convergence protocol (PDCP)). The BB processor 1026 may have a part or all of the above-described logical functions instead of the controller 1021. The BB processor 1026 may be a memory that stores a communication control program, or a module that includes a processor and a related circuit configured to execute the program. Updating the program may allow the functions of the BB processor 1026 to be changed. The module may be a card or a blade that is inserted into a slot of the base station apparatus 1020. Alternatively, the module may also be a chip that is mounted on the card or the blade. Meanwhile, the RF circuit 1027 may include, for example, a mixer, a filter, and an amplifier, and transmits and receives wireless signals via the antenna 1010.

As shown in FIG. 10, the wireless communication interface 1025 may include the multiple BB processors 1026. For example, the multiple BB processors 1026 may be compatible with multiple frequency bands used by the eNB 1000. As shown in FIG. 10, the wireless communication interface 1025 may include the multiple RF circuits 1027. For example, the multiple RF circuits 1027 may be compatible with multiple antenna elements. Although FIG. 10 shows the example in which the wireless communication interface 1025 includes the multiple BB processors 1026 and the multiple RF circuits 1027, the wireless communication interface 1025 may also include a single BB processor 1026 or a single RF circuit 1027.

Figure 11:
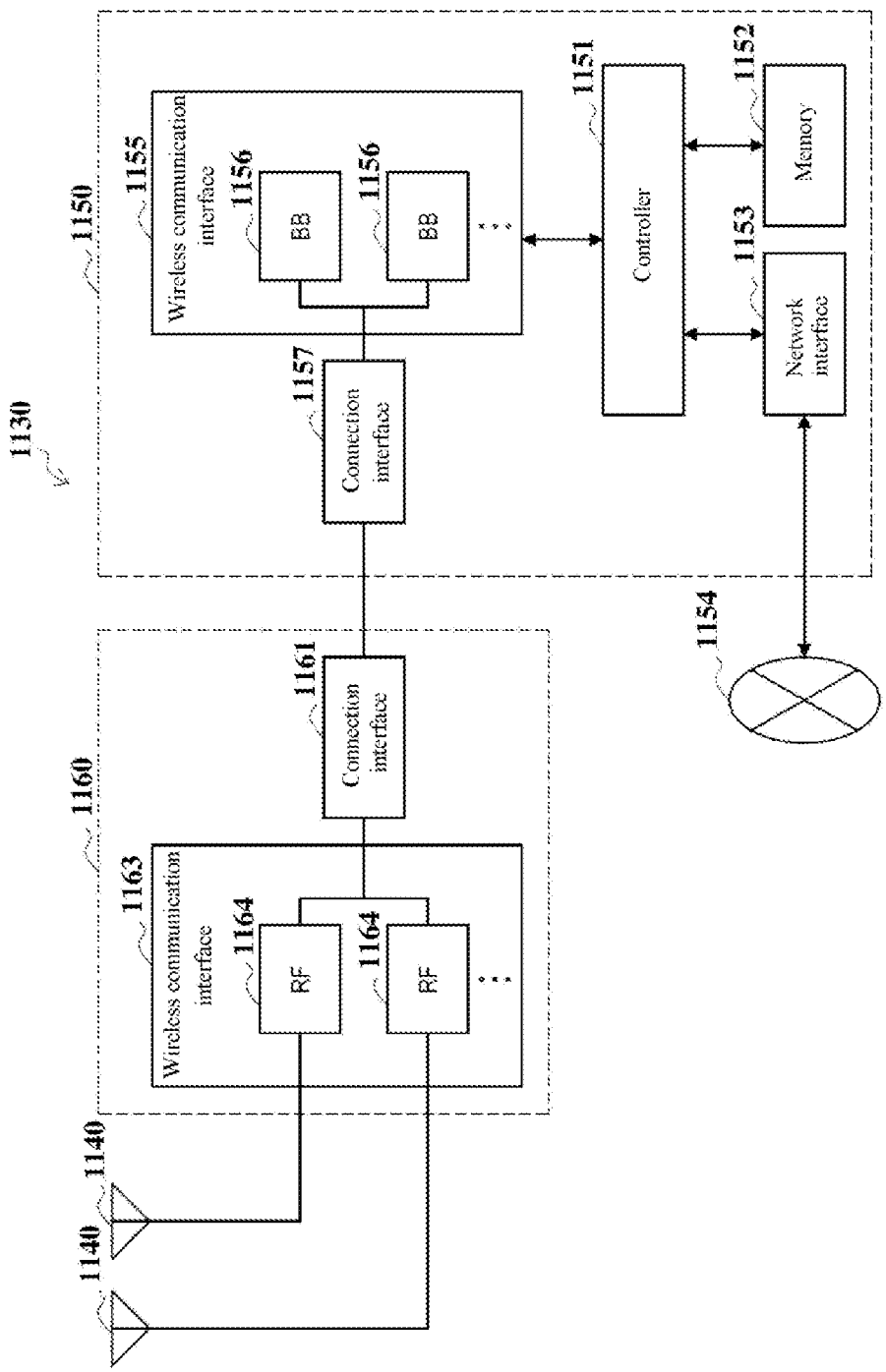
FIG. 11 is a block diagram showing a second schematic configuration example of an eNB to which the present disclosure may be applied.

FIG. 11 is a block diagram showing a second schematic configuration example of an eNB to which the technology of the present disclosure may be applied. An eNB 1130 includes one or more antennas 1140, a base station apparatus 1150, and an RRH 1160. Each antenna 1140 and the RRH 1160 may be connected to each other via an RF cable. The base station apparatus 1150 and the RRH 1160 may be connected to each other via a high speed line such as an optical fiber cable.

Each of the antennas 1140 includes a single or multiple antenna elements (such as multiple antenna elements included in an MIMO antenna), and is used for the RRH 1160 to transmit and receive radio signals. As shown in FIG. 11, the eNB 1130 may include the multiple antennas 1140. For example, the multiple antennas 1140 may be compatible with multiple frequency bands used by the eNB 1130. Although FIG. 11 shows the example in which the eNB 1130 includes the multiple antennas 1140, the eNB 1130 may also include a single antenna 1140.

The base station apparatus 1150 includes a controller 1151, a memory 1152, a network interface 1153, a wireless communication interface 1155, and a connection interface 1157. The controller 1151, the memory 1152, and the network interface 1153 are the same as the controller 1021, the memory 1022, and the network interface 1023 described with reference to FIG. 10.

The wireless communication interface 1155 supports any cellular communication scheme (such as LTE and LTE-Advanced), and provides wireless communication to a terminal positioned in a sector corresponding to the RRH 1160 via the RRH 1160 and the antenna 1140. The wireless communication interface 1155 may typically include, for example, a BB processor 1156. The BB processor 1156 is the same as the BB processor 1026 described with reference to FIG. 10, except the BB processor 1156 is connected to the RF circuit 1164 of the RRH 1160 via the connection interface 1157. As shown in FIG. 11, the wireless communication interface 1155 may include the multiple BB processors 1156. For example, the multiple BB processors 1156 may be compatible with multiple frequency bands used by the eNB 1130. Although FIG. 11 shows the example in which the wireless communication interface 1155 includes the multiple BB processors 1156, the wireless communication interface 1155 may also include a single BB processor 1156.

The connection interface 1157 is an interface for connecting the base station apparatus 1150 (wireless communication interface 1155) to the RRH 1160. The connection interface 1157 may also be a communication module for communication in the above-described high speed line that connects the base station apparatus 1150 (wireless communication interface 1155) to the RRH 1160.

The RRH 1160 includes a connection interface 1161 and a wireless communication interface 1163.

The connection interface 1161 is an interface for connecting the RRH 1160 (wireless communication interface 1163) to the base station apparatus 1150. The connection interface 1161 may also be a communication module for communication in the above-described high speed line.

The wireless communication interface 1163 transmits and receives wireless signals via the antenna 1140. The wireless communication interface 1163 may typically include, for example, the RF circuit 1164. The RF circuit 1164 may include, for example, a mixer, a filter, and an amplifier, and transmits and receives wireless signals via the antenna 1140. As shown in FIG. 11, the wireless communication interface 1163 may include multiple RF circuits 1164. For example, the multiple RF circuits 1164 may support multiple antenna elements. Although FIG. 11 shows the example in which the wireless communication interface 1163 includes the multiple RF circuits 1164, the wireless communication interface 1163 may also include a single RF circuit 1164.

In the eNB 1000 shown in FIG. 10 and the eNB 1130 shown in FIG. 11, the processing circuit 510 described with reference to FIG. 5 and the acquisition units 511 and 512 thereof may be implemented by the controller 1021 and/or the controller 1151, and the communication unit 520 described with reference to FIG. 5 may be implemented by the wireless communication interface 1025 and the wireless communication interface 1155 and/or the wireless communication interface 1163. At least a part of the functions may also be implemented by the controller 1021 and the controller 1151. For example, the controller 1021 and/or the controller 1151 may implement the functions of acquiring the NACK message and failure cause information to inform a spectrum management server and acquiring spectrum sensing parameter information by executing instructions stored in memories.

Figure 12:
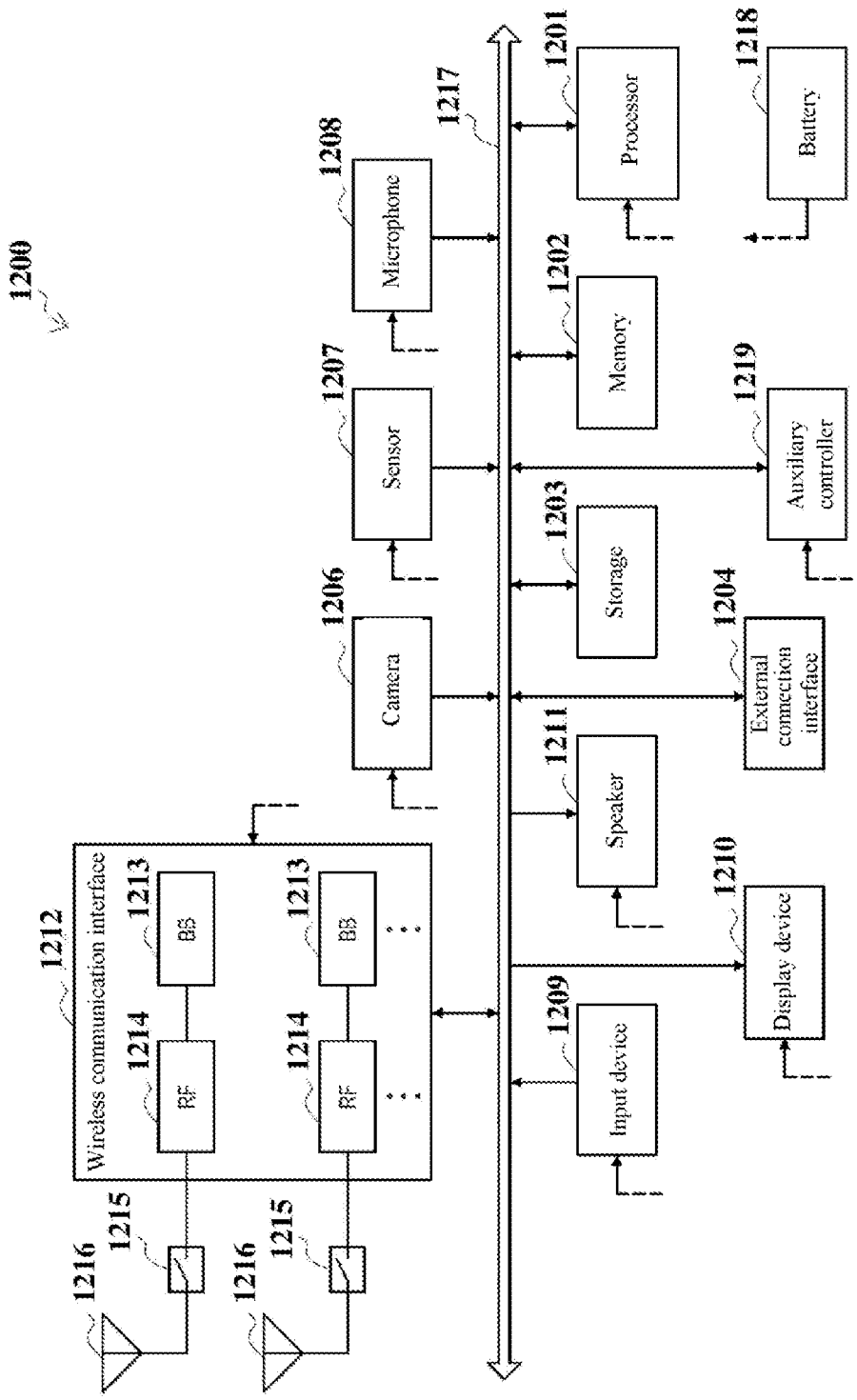
FIG. 12 is a block diagram showing a schematic configuration example of a smartphone to which the present disclosure may be applied.

FIG. 12 is a block diagram showing a schematic configuration example of a smartphone 1200 to which the technology of the present disclosure may be applied. The smartphone 1200 includes a processor 1201, a memory 1202, a storage 1203, an external connection interface 1204, a camera 1206, a sensor 1207, a microphone 1208, an input device 1209, a display device 1210, a speaker 1211, a wireless communication interface 1212, one or more antenna switches 1215, one or more antennas 1216, a bus 1217, a battery 1218, and an auxiliary controller 1219.

The processor 1201 may be, for example, a CPU or a system on a chip (SoC), and controls functions of an application layer and another layer of the smartphone 1200. The memory 1202 includes RAM and ROM, and stores a program that is executed by the processor 1201 and data. The storage 1203 may include a storage medium such as a semiconductor memory and a hard disk. The external connection interface 1204 is an interface for connecting an external device (such as a memory card and a universal serial bus (USB) device) to the smartphone 1200.

The camera 1206 includes an image sensor (such as a charge coupled device (CCD) and a complementary metal oxide semiconductor (CMOS)), and generates a captured image. The sensor 1207 may include a group of sensors such as a measurement sensor, a gyro sensor, a geomagnetic sensor and an acceleration sensor. The microphone 1208 converts sounds that are input to the smartphone 1200 to audio signals. The input device 1209 includes, for example, a touch sensor configured to detect touch onto a screen of the display device 1210, a keypad, a keyboard, a button or a switch, and receives an operation or an information input from a user. The display device 1210 includes a screen such as a liquid crystal display (LCD) and an organic light-emitting diode (OLED) display, and displays an output image of the smartphone 1200. The speaker 1211 converts audio signals outputted from the smartphone 1200 to sounds.

The wireless communication interface 1212 supports any cellular communication scheme such as LET and LTE-Advanced, and performs wireless communication. The wireless communication interface 1212 may typically include, for example, a BB processor 1213 and an RF circuit 1214. The BB processor 1213 may perform, for example, encoding/decoding, modulating/demodulating, and multiplexing/demultiplexing, and performs various types of signal processing for wireless communication. Meanwhile, the RF circuit 1214 may include, for example, a mixer, a filter and an amplifier, and transmits and receives wireless signals via the antenna 1216. The wireless communication interface 1212 may be a one chip module having the BB processor 1213 and the RF circuit 1214 integrated thereon. As shown in FIG. 12, the wireless communication interface 1212 may include the multiple BB processors 1213 and the multiple RF circuits 1214. Although FIG. 12 shows the example in which the wireless communication interface 1212 includes the multiple BB processors 1213 and the multiple RF circuits 1214, the wireless communication interface 1212 may also include a single BB processor 1213 or a single RF circuit 1214.

Furthermore, in addition to a cellular communication scheme, the wireless communication interface 1212 may support another type of wireless communication scheme such as a short-distance wireless communication scheme, a near field communication scheme, and a wireless local area network (LAN) scheme. In that case, the wireless communication interface 1212 may include the BB processor 1213 and the RF circuit 1214 for each wireless communication scheme.

Each of the antenna switches 1215 switches connection destinations of the antennas 1216 among multiple circuits (such as circuits for different wireless communication schemes) included in the wireless communication interface 1212.

Each of the antennas 1216 includes a single or multiple antenna elements (such as multiple antenna elements included in an MIMO antenna), and is used for the wireless communication interface 1212 to transmit and receive wireless signals. As shown in FIG. 12, the smartphone 1200 may include the multiple antennas 1216. Although FIG. 12 shows the example in which the smartphone 1200 includes the multiple antennas 1216, the smartphone 1200 may also include a single antenna 1216.

Furthermore, the smartphone 1200 may include the antenna 1216 for each wireless communication scheme. In that case, the antenna switches 1215 may be omitted from the configuration of the smartphone 1200.

The bus 1217 connects the processor 1201, the memory 1202, the storage 1203, the external connection interface 1204, the camera 1206, the sensor 1207, the microphone 1208, the input device 1209, the display device 1210, the speaker 1211, the wireless communication interface 1212, and the auxiliary controller 1219 to each other. The battery 1218 supplies power to blocks of the smartphone 1200 shown in FIG. 12 via feed lines, which are partially shown as dashed lines in the FIG. 12. The auxiliary controller 1219 operates a minimum necessary function of the smartphone 1200, for example, in a sleep mode.

In the smartphone 1200 shown in FIG. 12, the processing circuit 610 described with reference to FIG. 6 and the generation unit 611 thereof may be implemented by the processor 1201 or the auxiliary controller 1219, and the communication unit 620 described with reference to FIG. 6 may be implemented by the wireless communication interface 1212. At least a part of the functions may also be implemented by the processor 1201 or the auxiliary controller 1219. For example, the processor 1201 or the auxiliary controller 1219 can implement the function of generating the NACK message and the failure cause information by executing instructions stored in the memory 1202 or the storage 1203.

Figure 13:
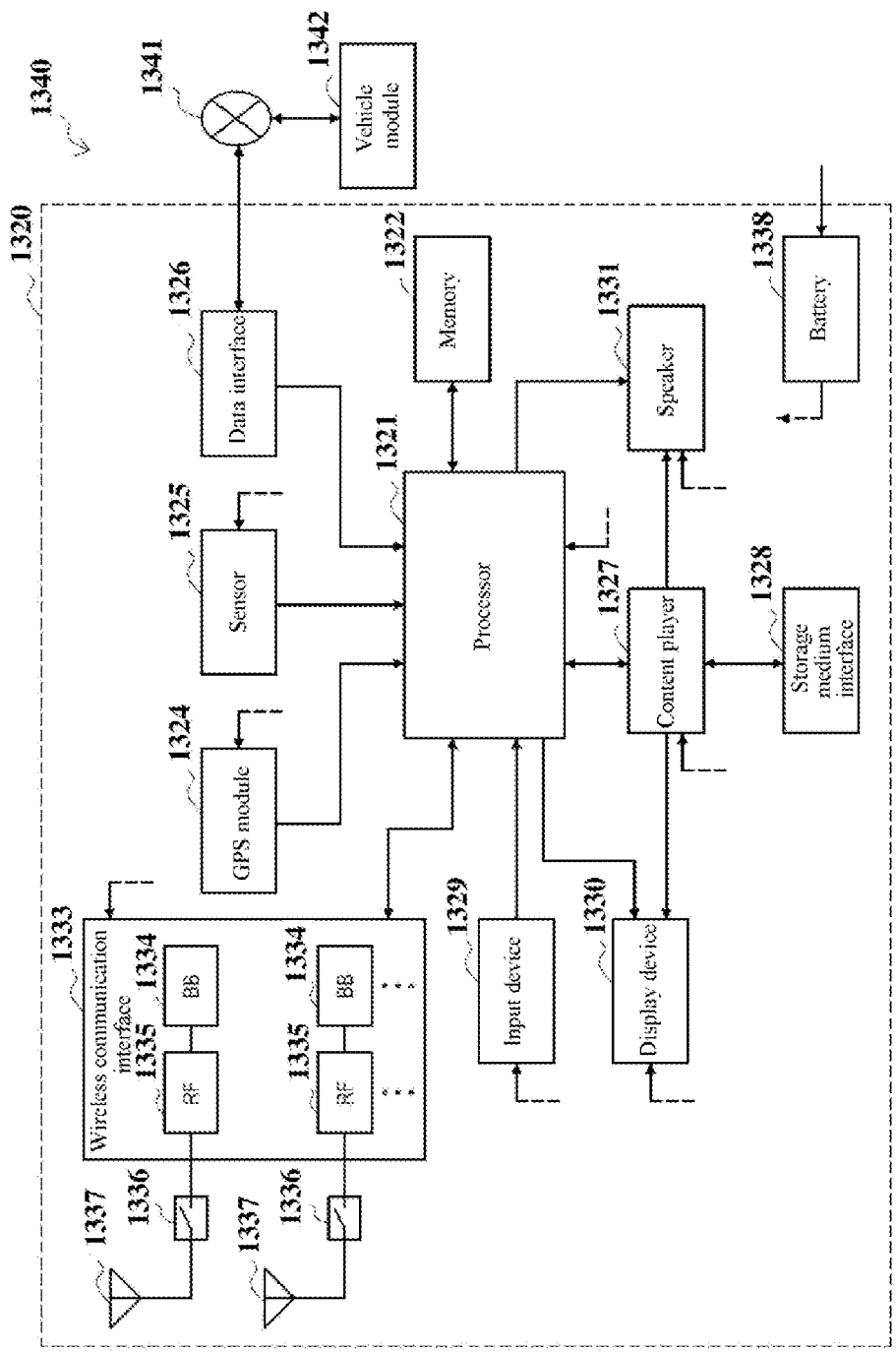
FIG. 13 is a block diagram showing a schematic configuration example of a car navigation apparatus to which the present disclosure may be applied.

FIG. 13 is a block diagram showing an example of a schematic configuration of a car navigation apparatus 1320 to which the technology of the present disclosure may be applied. The car navigation apparatus 1320 includes a processor 1321, a memory 1322, a global positioning system (GPS) module 1324, a sensor 1325, a data interface 1326, a content player 1327, a storage medium interface 1328, an input device 1329, a display device 1330, a speaker 1331, a wireless communication interface 1333, one or more antenna switches 1336, one or more antennas 1337, and a battery 1338.

The processor 1321 may be, for example, a CPU or a SoC, and controls a navigation function and another function of the car navigation apparatus 1320. The memory 1322 includes a RAM and a ROM, and stores a program executed by the processor 1321, and data.

The GPS module 1324 uses GPS signals received from a GPS satellite to determine a position (such as latitude, longitude, and altitude) of the car navigation apparatus 1320. The sensor 1325 may include a group of sensors such as a gyro sensor, a geomagnetic sensor, and an air pressure sensor. The data interface 1326 is connected to, for example, an in-vehicle network 1341 via a terminal that is not shown, and acquires data (such as vehicle speed data) generated by the vehicle.

The content player 1327 reproduces content stored in a storage medium (such as a CD and a DVD) that is inserted into the storage medium interface 1328. The input device 1329 includes, for example, a touch sensor configured to detect touch onto a screen of the display device 1330, a button or a switch, and receives an operation or information inputted from a user. The display device 1330 includes a screen such as a LCD or an OLED display, and displays an image of the navigation function or content that is reproduced. The speaker 1331 outputs sounds of the navigation function or the content that is reproduced.

The wireless communication interface 1333 supports any cellular communication scheme (such as LTE and LTE-Advanced), and performs wireless communication. The wireless communication interface 1333 may typically include, for example, a BB processor 1334 and an RF circuit 1335. The BB processor 1334 may perform, for example, encoding/decoding, modulating/demodulating, and multiplexing/demultiplexing, and performs various types of signal processing for wireless communication. Meanwhile, the RF circuit 1335 may include, for example, a mixer, a filter, and an amplifier, and transmits and receives wireless signals via the antenna 1337. The wireless communication interface 1333 may also be a one chip module that has the BB processor 1334 and the RF circuit 1335 integrated thereon. As shown in FIG. 13, the wireless communication interface 1333 may include the multiple BB processors 1334 and the multiple RF circuits 1335. Although FIG. 13 shows the example in which the wireless communication interface 1333 includes the multiple BB processors 1334 and the multiple RF circuits 1335, the wireless communication interface 1333 may also include a single BB processor 1334 or a single RF circuit 1335.

Furthermore, in addition to the cellular communication scheme, the wireless communication interface 1333 may support another type of wireless communication scheme such as a short-distance wireless communication scheme, a near field communication scheme, and a wireless LAN scheme. In that case, the wireless communication interface 1333 may include the BB processor 1334 and the RF circuit 1335 for each wireless communication scheme.

Each of the antenna switches 1336 switches connection destinations of the antennas 1337 among multiple circuits (such as circuits for different wireless communication schemes) included in the wireless communication interface 1333.

Each of the antennas 1337 includes a single or multiple antenna elements (such as multiple antenna elements included in an MIMO antenna), and is used for the wireless communication interface 1333 to transmit and receive wireless signals. As shown in FIG. 13, the car navigation apparatus 1320 may include the multiple antennas 1337. Although FIG. 13 shows the example in which the car navigation apparatus 1320 includes the multiple antennas 1337, the car navigation apparatus 1320 may also include a single antenna 1337.

Furthermore, the car navigation apparatus 1320 may include the antenna 1337 for each wireless communication scheme. In that case, the antenna switches 1336 may be omitted from the configuration of the car navigation apparatus 1320.

The battery 1338 supplies power to blocks of the car navigation apparatus 1320 shown in FIG. 13 via feed lines that are partially shown as dashed lines in the FIG. 13. The battery 1338 accumulates power supplied form the vehicle.

In the car navigation apparatus 1320 shown in FIG. 13, the processing circuit 610 described with reference to FIG. 6 and the generation unit 611 thereof may be implemented by the processor 1321, and the communication unit 620 described with reference to FIG. 6 may be implemented by the wireless communication interface 1333. At least a part of the functions may also be implemented by the processor 1321. For example, the processor 1321 can implement the function of generating the NACK message and the failure cause information by executing instructions stored in the memory 1322.

The technology of the present disclosure may also be implemented as an in-vehicle system (or a vehicle) 1340 including one or more blocks of the car navigation apparatus 1320, the in-vehicle network 1341 and a vehicle module 1342. The vehicle module 1342 generates vehicle data (such as a vehicle speed, an engine speed or failure information), and outputs the generated data to the in-vehicle network 1341.

In the system and method according to the present disclosure, the respective components or steps can be decomposed and/or recombined. These decompositions and/or recombination shall be regarded as equivalent solutions of the present disclosure. Moreover, steps for executing the above series of processing can naturally be executed chronologically in the sequence as described above, but is not limited thereto, and some of the steps can be performed in parallel or individually.

Although the embodiments of the present disclosure have been described above in detail in connection with the drawings, it shall be appreciated that the embodiments as described above are merely illustrative rather than limitative for the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic device in a wireless communication system, comprising:
    one or more processing circuits configured to:
        acquire a NACK message indicating failed information transmission between a transmitting end and a receiving end in the wireless communication system and failure cause information indicating a cause of the failed information transmission, wherein the cause of the failed information transmission comprises a link quality cause and a non-link quality cause; and
        generate spectrum sensing parameter information when it is determined that the cause of the failed information transmission is the non-link quality cause to adjust a spectrum sensing parameter of the transmitting end, so as to increase a probability of successful information transmission between the transmitting end and the receiving end.

2. The electronic device according to claim 1, wherein for generating the spectrum sensing parameter information, the processing circuit is further configured to:
    acquire hidden node information indicating whether a hidden node exists, and
    enable the spectrum sensing parameter information to be used for reducing an energy detection threshold of the transmitting end, in a case where the hidden node information indicates that a hidden node exists, such that the hidden node is sensed by the transmitting end.

3. The electronic device according to claim 2, wherein before acquiring the hidden node information, the processing circuit is further configured to:
    generate a command to instruct the receiving end to sense whether a hidden node exists in the vicinity of the receiving end.

4. The electronic device according to claim 2, wherein in a case where the hidden node information indicates that no hidden node exists, the processing circuit is further configured to:
    enable the spectrum sensing parameter information to be used for increasing a contention window size or a value of a counter of the transmitting end.

5. The electronic device according to claim 1, wherein in a case where the probability of successful information transmission between the transmitting end and the receiving end is increased, the processing circuit is further configured to:
    generate a command to recover the spectrum sensing parameter of the transmitting end upon elapse of a preset time period.

6. The electronic device according to claim 1, wherein for determining the cause of the failed information transmission is the non-link quality cause, the processing circuit is further configured to:
    acquire a plurality of NACK messages and a plurality of pieces of failure cause information during a preset time period; and
    determine the cause of the failed information transmission is the non-link quality cause based on a ratio of the number of pieces of failure cause information indicating that the cause of the failed information transmission is the non-link quality cause to the number of the NACK messages.

7. The electronic device according to claim 6, wherein when it is determined the cause of the failed information transmission is the non-link quality cause, the processing circuit is further configured to:

determine, based on the ratio, whether a hidden node exists;
enable the spectrum sensing parameter information to reduce an energy detection threshold of the transmitting end when the hidden node exists, such that the hidden node is sensed by the transmitting end; and
enable the spectrum sensing parameter information to increase a contention window size or a value of a counter of the transmitting end when a hidden node does not exist.

8. The electronic device according to claim 1, wherein for determining the cause of the failed information transmission is the non-link quality cause, the processing circuit is further configured to:
acquire a plurality of NACK messages and a plurality of pieces of failure cause information, as well as a plurality of ACK messages indicating successful information transmission between the transmitting end and the receiving end during a preset time period; and
determine the cause of the failed information transmission is the non-link quality cause based on a ratio of the number of pieces of failure cause information indicating that the cause of the failed information transmission is the non-link quality cause to a sum of the number of the NACK messages and the number of the ACK messages.

9. The electronic device according to claim 1, wherein the electronic device is a spectrum management server in a core network.

10. An electronic device in a wireless communication system, comprising:
one or more processing circuits configured to:
acquire a NACK message indicating failed information transmission between a transmitting end and a receiving end in the wireless communication system and failure cause information indicating a cause of the failed information transmission, to inform a spectrum management server in the wireless communication system, wherein the cause of the failed information transmission comprises a link quality cause and a non-link quality cause; and
acquire spectrum sensing parameter information from the spectrum management server to adjust a spectrum sensing parameter of the transmitting end, so as to increase a probability of successful information transmission between the transmitting end and the receiving end.

11. The electronic device according to claim 10, wherein before acquiring the spectrum sensing parameter information from the spectrum management server, the processing circuit is further configured to:
acquire hidden node information indicating whether a hidden node exists, to inform the spectrum management server.

12. The electronic device according to claim 11, wherein the electronic device is located on a side of the transmitting end, and the processing circuit acquires the NACK message, the failure cause information and the hidden node information from the receiving end.

13. The electronic device according to claim 12, wherein the processing circuit is further configured to perform, based on the spectrum sensing parameter information, at least one of:
reducing an energy detection threshold of the transmitting end so that the hidden node is sensed by the transmitting end; and
increasing a contention window size or a value of a counter of the transmitting end.

14. The electronic device according to claim 11, wherein the electronic device is located on a side of the receiving end, and for acquiring the NACK message and the failure cause information, the processing circuit is further configured to:
generate the NACK message when the failed information transmission occurs;
detect a value of a reference signal received power RSRP of a communication link between the receiving end and the transmitting end;
detect an interference value of an interference signal from a neighbor cell; and
generate the failure cause information based on the value of the RSRP and the interference value.

15. The electronic device according to claim 14, wherein for generating the failure cause information based on the value of the RSRP and the interference value, the processing circuit is further configured to:
generate failure cause information indicating that the cause of the failed information transmission is the non-link quality cause in a case where the value of the RSRP is greater than a first threshold and the interference value is less than a second threshold; and
generate failure cause information indicating that the cause of the failed information transmission is the link quality cause in a case where the value of the RSRP is less than or equal to the first threshold and/or the interference value is greater than or equal to the second threshold.

16. The electronic device according to claim 14, wherein for acquiring the hidden node information, the processing circuit is further configured to:
sense whether a hidden node exists in the vicinity of the receiving end; and
generate the hidden node information based on a sensed result.

17. A user equipment in a wireless communication system, wherein the user equipment operates as a receiving end and comprises:
a transceiver; and
one or more processing circuits configured to:
generate a NACK message indicating failed information transmission between a base station serving as a transmitting end and the user equipment in the wireless communication system and failure cause information indicating a cause of the failed information transmission, wherein the cause of the failed information transmission comprises a link quality cause and a non-link quality cause; and
control the transceiver to transmit the NACK message and the failure cause information to the base station, to inform a spectrum management server in the wireless communication system.

18. The user equipment according to claim 17, wherein if it is determined that the cause of the failed information transmission is the non-link quality cause, the processing circuit is further configured to:
sense whether a hidden node exists in the vicinity of the user equipment;
generate, based on a sensed result, hidden node information indicating whether the hidden node exists; and
control the transceiver to transmit the hidden node information to the base station, to inform the spectrum management server.

19. The user equipment according to claim 17, wherein for generating the NACK message and the failure cause information, the processing circuit is further configured to:
- generate the NACK message when the failed information transmission occurs;
- detect a value of a reference signal received power RSRP of a communication link between the base station and the user equipment;
- detect an interference value of an interference signal from a neighbor cell; and
- generate the failure cause information based on the value of the RSRP and the interference value.

20. The user equipment according to claim 19, wherein for generating the failure cause information based on the value of the RSRP and the interference value, the processing circuit is further configured to:
- generate failure cause information indicating that the cause of the failed information transmission is the non-link quality cause in a case where the value of the RSRP is greater than a first threshold and the interference value is less than a second threshold; and
- generate failure cause information indicating that the cause of the failed information transmission is the link quality cause in a case where the value of the RSRP is less than or equal to the first threshold and/or the interference value is greater than or equal to the second threshold.

* * * * *